US011375118B2

(12) United States Patent
Uchida et al.

(10) Patent No.: US 11,375,118 B2
(45) Date of Patent: Jun. 28, 2022

(54) IMAGING DEVICE, IMAGING CONTROL METHOD, AND PROGRAM

(71) Applicant: FUJIFILM Corporation, Tokyo (JP)

(72) Inventors: Akihiro Uchida, Saitama (JP); Kenkichi Hayashi, Saitama (JP); Hideo Kobayashi, Saitama (JP); Seiichi Izawa, Saitama (JP); Koichi Tanaka, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 279 days.

(21) Appl. No.: 16/584,688

(22) Filed: Sep. 26, 2019

(65) Prior Publication Data

US 2020/0029021 A1   Jan. 23, 2020

Related U.S. Application Data

(63) Continuation of application No. PCT/JP2018/003483, filed on Feb. 1, 2018.

(30) Foreign Application Priority Data

Mar. 30, 2017 (JP) .............................. JP2017-068524

(51) Int. Cl.
*H04N 5/232* (2006.01)
*H04N 5/225* (2006.01)

(52) U.S. Cl.
CPC ....... *H04N 5/23287* (2013.01); *H04N 5/2254* (2013.01); *H04N 5/23258* (2013.01); *H04N 5/23293* (2013.01)

(58) Field of Classification Search
CPC ............. H04N 5/23287; H04N 5/2254; H04N 5/23258; H04N 5/23293; G03B 5/00
See application file for complete search history.

(56) References Cited

U.S. PATENT DOCUMENTS

| 6,014,169 A * | 1/2000 | Azusawa ................. G03B 5/00 348/208.8 |
| 2007/0122134 A1* | 5/2007 | Suzuki .................... G03B 17/20 396/55 |
| 2010/0277604 A1 | 11/2010 | Sasaki et al. | |

FOREIGN PATENT DOCUMENTS

| CN | 101876775 A | 11/2010 |
| CN | 103248815 A | 8/2013 |

(Continued)

OTHER PUBLICATIONS

International Preliminary Report on Patentability, dated Mar. 19, 2019, for corresponding International Application No. PCT/JP2018/003483, along with an English translation.

(Continued)

*Primary Examiner* — Yogesh K Aggarwal
(74) *Attorney, Agent, or Firm* — Birch, Stewart, Kolasch & Birch LLP

(57) ABSTRACT

An imaging device includes: a suppression unit that moves an anti-vibration element to a position, which is determined according to a detection result of a detection unit detecting vibration applied to the device, to suppress an influence of the vibration on a subject image; and a control unit that performs control on a display unit to display the subject image as a video image and performs control on the suppression unit to center the anti-vibration element while a visibility-obstruction phenomenon, which is predetermined as a phenomenon where the visual recognition of a shift in an angle of view caused by the centering of the anti-vibration element can be obstructed, occurs in a state where an operation for displaying the video image by the display unit is being performed and an operation for suppressing the influence by the suppression unit is being performed.

23 Claims, 16 Drawing Sheets

(56) References Cited

FOREIGN PATENT DOCUMENTS

| JP | 6-303492 A | 10/1994 |
| JP | 2007-150740 A | 6/2007 |
| JP | 2009-251492 A | 10/2009 |
| JP | 2009-284117 A | 12/2009 |
| JP | 2013-11637 A | 1/2013 |
| JP | 2016-51044 A | 4/2016 |
| JP | 2016-126164 A | 7/2016 |

OTHER PUBLICATIONS

Written Opinion of the International Preliminary Examination Authority, dated Apr. 24, 2018, and International Search Report, dated Apr. 24, 2018, for corresponding International Application No. PCT/JP2018/003483, with English translations.

Chinese Office Action and Search Report for corresponding Chinese Application No. 201880022268.1, dated Nov. 23, 2020, with an English translation.

* cited by examiner

IMAGING DEVICE, IMAGING CONTROL METHOD, AND PROGRAM

CROSS-REFERENCE TO RELATED APPLICATIONS

This application is a continuation application of International Application No. PCT/JP2018/003483, filed Feb. 1, 2018, the disclosure of which is incorporated herein by reference in its entirety. Further, this application claims priority from Japanese Patent Application No. 2017-068524, filed Mar. 30, 2017, the disclosure of which is incorporated herein by reference in its entirety.

BACKGROUND

1. Technical Field

A technique of the present disclosure relates to an imaging device, an imaging control method, and a program.

2. Related Art

An imaging device is provided with an imaging element that receives reflected light representing a subject as a subject image. In a case where shake, which is a phenomenon where an imaging device is vibrated due to the transmission of the vibration of user's hands to the imaging device, occurs, image blur, which is a phenomenon where a subject image is shifted from a specific position (for example, the position of a subject image to be obtained in a state where shake does not occur, occurs with the shake. Image blur is visually recognized by a user through an image that is obtained from imaging performed by an imaging element.

Image blur is not a phenomenon that occurs due to only shake. For example, in a case where an imaging device is installed on a vehicle, image blur may occur due to the transmission of the vibration of a vehicle to the imaging device.

An imaging device (hereinafter, referred to as "an imaging device already known in the related art") having an optical-image-stabilizer (OIS) function and a body-image-stabilizer (BIS) function is known as an imaging device that suppresses image blur.

Here, the OIS function refers to a function to move an anti-vibration lens, which is mounted on an imaging lens, to suppress image blur and the like. Here, the BIS function refers to a function to move an imaging element, such as a charge coupled device (CCD) image sensor, to suppress image blur and the like.

In the imaging device already known in the related art, image blur occurring during the display of a live view image is suppressed by the OIS function. Here, the live view image is also referred to as a through image, is a continuous frame image that is obtained from the imaging of a subject with a continuous frame, and is continuously displayed on the screen of a display device, such as a liquid crystal display (LCD).

However, since the anti-vibration lens is moved and subject light is refracted in the case of the OIS function, aberration in a case where the anti-vibration lens is stopped is different from aberration in a case where the anti-vibration lens is moved. As a result, there is a concern that the quality of an image obtained from imaging may deteriorate. For this reason, to suppress the deterioration of image quality, it is preferable that the anti-vibration lens is not moved from a reference position. Here, the reference position refers to the position of the anti-vibration lens in a state where vibration is not applied to the imaging device, that is, the position of the anti-vibration lens in a case where the center of the anti-vibration lens coincides with an optical axis.

JP2009-251492A discloses a technique where an anti-vibration lens is centered at the time of end of imaging. Further, JP2016-051044A also discloses a technique relating to the centering of an anti-vibration lens. In the technique disclosed in JP2016-051044A, the movement of an anti-vibration lens to a reference position in a period where the focusing position of a focus lens is detected is restricted as compared to the movement of the anti-vibration lens to the reference position in a period where the focus lens is moved to the focusing position. "Centering" about the anti-vibration lens refers to an operation for returning the anti-vibration lens to the reference position.

SUMMARY

However, in the techniques disclosed in JP2009-251492A and JP2016-051044A, a shift in the angle of view is caused by the centering of the anti-vibration lens, and a shift in the angle of view caused by centering may be visually perceived in a case where centering is performed during the display of a video image, such as a live view image. Here, "a shift in the angle of view" refers to a shift in the angle of view of an image displayed on the display device.

An embodiment of the invention provides an imaging device, an imaging control method, and a program that can suppress the visual perception of a shift in the angle of view caused by the centering of an anti-vibration element as compared to a case where the centering of the anti-vibration elements is performed in a state where an image obtained from imaging is immediately displayed as a video image.

An imaging device according to a first aspect comprises: a suppression unit that moves an anti-vibration element including at least one of an imaging element, which receives reflected light representing a subject as a subject image, or an anti-vibration lens, which is provided in an imaging lens mounted on an imaging device body including the imaging element, to a position, which is determined according to a detection result of a detection unit detecting vibration applied to a device, to suppress an influence of the vibration on the subject image; and a control unit that performs control on a display unit, which displays an image, to display the subject image, which is received by the imaging element, as a video image and performs control on the suppression unit to center the anti-vibration element while a visibility-obstruction phenomenon, which is predetermined as a phenomenon where visual recognition of a shift in an angle of view caused by centering of the anti-vibration element is capable of being obstructed, occurs in a state where an operation for displaying the video image by the display unit is being performed and an operation for suppressing the influence by the suppression unit is being performed.

Therefore, according to the imaging device of the first aspect, the visual perception of a shift in the angle of view caused by the centering of the anti-vibration element can be suppressed as compared to a case where the centering of the anti-vibration element is performed in a state where an image obtained from imaging is immediately displayed as a video image.

According to a second aspect, in the imaging device according to the first aspect, the visibility-obstruction phenomenon occurs in a case where a video recording-start condition where recording of the video image is to be started is satisfied.

Therefore, according to the imaging device of the second aspect, the deterioration of the image quality of a recorded video image can be suppressed as compared to a case where the anti-vibration element is not centered while a visibility-obstruction phenomenon, in a case where the video recording-start condition is satisfied, occurs.

According to a third aspect, in the imaging device according to the first aspect, the visibility-obstruction phenomenon occurs in a case where a video recording-end condition where recording of the video image is to end is satisfied, and the control unit performs control on the suppression unit to stop the operation for suppressing the influence by the suppression unit and performs control on the display unit to display the subject image, which is received by the imaging element, as a video image in a case where the centering of the anti-vibration element is completed.

Therefore, according to the imaging device of the third aspect, the recording of a video image can be quickly started as compared to a case where the anti-vibration element is centered with the start of the recording of a video image.

According to a fourth aspect, in the imaging device according to the third aspect, the control unit performs control on the suppression unit to start the operation for suppressing the influence by the suppression unit in a case where a video recording-start condition where recording of the video image is to be started is satisfied in a state where the operation for suppressing the influence by the suppression unit is stopped.

Therefore, according to the imaging device of the fourth aspect, both the influence of vibration, which is applied to the device, on the subject image and the deterioration of image quality in a case where the recording of a video image is started can be suppressed as compared to a case where the suppression operation of the suppression unit is started with the start of the recording of a video image in a state where the centering is not completed.

According to a fifth aspect, in the imaging device according to any one of the first to fourth aspects, the visibility-obstruction phenomenon includes a blackout.

Therefore, according to the imaging device of the fifth aspect, the stop of an operation for displaying a video image for only the centering of the anti-vibration element can be avoided.

According to a sixth aspect, in the imaging device according to the fifth aspect, the blackout occurs in a case where start of recording of the video image is instructed during the operation for displaying the video image by the display unit.

Therefore, according to the imaging device of the sixth aspect, the centering of the anti-vibration element can be performed at a timing that is intended by a user in a case where the recording of a video image is to be started.

According to a seventh aspect, in the imaging device according to any one of the first to sixth aspects, the visibility-obstruction phenomenon includes a freeze.

Therefore, according to the imaging device of the seventh aspect, the stop of an operation for displaying a video image for only the centering of the anti-vibration element can be avoided.

According to an eighth aspect, in the imaging device according to the seventh aspect, the control unit performs control on the display unit to cause the freeze to occur by displaying images, which correspond to one or more frames and are included in the video image, in a static state in a case where the start of the recording of the video image is instructed in a state where the video image is displayed.

Therefore, according to the imaging device of the eighth aspect, the visual perception of a shift in the angle of view caused by the centering of the anti-vibration element can be suppressed as compared to a case where the anti-vibration element is centered in a state where a video image is displayed at a certain frame rate.

According to a ninth aspect, in the imaging device according to any one of the first to eighth aspects, the visibility-obstruction phenomenon includes a phenomenon where a plurality of images, each of which an absolute value of magnitude of a movement vector is equal to or larger than a first threshold value, among the images included in the video image, are displayed on the display unit.

Therefore, according to the imaging device of the ninth aspect, the stop of an operation for displaying a video image for only the centering of the anti-vibration element can be avoided.

According to a tenth aspect, in the imaging device according to any one of the first to ninth aspects, the visibility-obstruction phenomenon includes a phenomenon where a plurality of images, each of which the amount of change in a physical quantity representing brightness is equal to or larger than a second threshold value, among the images included in the video image, are displayed on the display unit.

Therefore, according to the imaging device of the tenth aspect, the stop of an operation for displaying a video image for only the centering of the anti-vibration element can be avoided.

According to an eleventh aspect, in the imaging device according to any one of the first to tenth aspects, the suppression unit is broadly divided into an imaging element-side suppression unit that moves the imaging element to the position determined according to the detection result to suppress the influence, and a lens-side suppression unit that moves the anti-vibration lens to the position determined according to the detection result to suppress the influence, the visibility-obstruction phenomenon is a phenomenon that is predetermined as a phenomenon where visual recognition of a shift in an angle of view caused by centering of the imaging element is capable of being obstructed, and the control unit performs control on the suppression unit to perform an operation for suppressing the influence by only the imaging element-side suppression unit out of the imaging element-side suppression unit and the lens-side suppression unit during the operation for displaying the video image by the display unit, and performs control on the imaging element-side suppression unit to center the imaging element while the visibility-obstruction phenomenon occurs in a state where the operation for displaying the video image by the display unit is being performed and an operation for suppressing the influence by only the imaging element-side suppression unit is being performed.

Therefore, according to the imaging device of the eleventh aspect, the deterioration of image quality, which is caused by a difference between the movable range of the anti-vibration lens and the movable range of the imaging element, can be suppressed as compared to a case where the suppression operation is performed by both the imaging element-side suppression unit and the lens-side suppression unit during the operation for displaying a video image.

According to a twelfth aspect, in the imaging device according to the eleventh aspect, the control unit performs control on the lens-side suppression unit to suppress the influence by the lens-side suppression unit in a case where the imaging element reaches a limit position of a movable range of the imaging element in a state where the operation for suppressing the influence by only the imaging element-side suppression unit is being performed.

Therefore, according to the imaging device of the twelfth aspect, the influence of vibration, which is applied to the device, on the subject image can be continuously suppressed even in a case where the imaging element reaches the limit position of the movable range of the imaging element.

According to a thirteenth aspect, in the imaging device according to the twelfth aspect, the control unit performs control on the suppression unit to make a suppression operation of the lens-side suppression unit be more dominant than a suppression operation of the imaging element-side suppression unit in a case where the imaging element reaches the limit position of the movable range of the imaging element while the recording of the video image is performed.

Therefore, according to the imaging device of the thirteenth aspect, the influence of vibration, which is applied to the device, on the subject image can be continuously suppressed in a case where the imaging element reaches the limit position of the movable range of the imaging element, namely, even in a case where the imaging element reaches the limit position of the movable range of the imaging element during the recording of a video image.

According to a fourteenth aspect, in the thirteenth aspect, the control unit performs control on the suppression unit to make the suppression operation of the imaging element-side suppression unit be more dominant than the suppression operation of the lens-side suppression unit in a case where a position of the anti-vibration lens falls within a movable range corresponding to the movable range of the imaging element while the control unit performs control on the suppression unit to make the suppression operation of the lens-side suppression unit be more dominant than the suppression operation of the imaging element-side suppression unit.

Therefore, according to the imaging device of the fourteenth aspect, the deterioration of image quality, which is caused by a change in aberration generated due to the movement of the anti-vibration lens, can be suppressed as compared to a case where the suppression operation of the lens-side suppression unit is performed to be always more dominant than the suppression operation of the imaging element-side suppression unit.

An imaging control method according to a fifteenth aspect comprises performing control on a display unit, which displays an image, to display a subject image, which is received by an imaging element receiving reflected light representing a subject as the subject image, as a video image; and causing a suppression unit to perform control centering an anti-vibration element, which includes at least one of the imaging element or an anti-vibration lens provided in an imaging lens mounted on an imaging device body including the imaging element, while a visibility-obstruction phenomenon, which is predetermined as a phenomenon where visual recognition of a shift in an angle of view caused by centering of the anti-vibration element is capable of being obstructed, occurs in a state where an operation for displaying the video image by the display unit is being performed and an operation for suppressing the influence by the suppression unit is being performed. The suppression unit moves the anti-vibration element to a position, which is determined according to a detection result of a detection unit detecting vibration applied to a device, to suppress an influence of the vibration on the subject image.

Therefore, according to the imaging control method of the fifteenth aspect, the visual perception of a shift in the angle of view caused by the centering of the anti-vibration element can be suppressed as compared to a case where the centering of the anti-vibration element is performed in a state where an image obtained from imaging is immediately displayed as a video image.

A program according to a sixteenth aspect causes a computer to perform processing including: performing control on a display unit, which displays an image, to display a subject image, which is received by an imaging element receiving reflected light representing a subject as the subject image, as a video image; and performing control on a suppression unit to center an anti-vibration element, which includes at least one of the imaging element or an anti-vibration lens provided in an imaging lens mounted on an imaging device body including the imaging element, while a visibility-obstruction phenomenon, which is predetermined as a phenomenon where visual recognition of a shift in an angle of view caused by centering of the anti-vibration element is capable of being obstructed, occurs in a state where an operation for displaying the video image by the display unit is being performed and an operation for suppressing the influence by the suppression unit is being performed. The suppression unit moves the anti-vibration element to a position, which is determined according to a detection result of a detection unit detecting vibration applied to a device, to suppress an influence of the vibration on the subject image.

Therefore, according to the program of the sixteenth aspect, the visual perception of a shift in the angle of view caused by the centering of the anti-vibration element can be suppressed as compared to a case where the centering of the anti-vibration element is performed in a state where an image obtained from imaging is immediately displayed as a video image.

According to an embodiment of the invention, it is possible to obtain an effect of suppressing the visual perception of a shift in the angle of view caused by the centering of an anti-vibration element as compared to a case where the centering of the anti-vibration element is performed in a state where an image obtained from imaging is immediately displayed as a video image.

BRIEF DESCRIPTION OF THE DRAWINGS

Exemplary embodiments according to the technique of the present disclosure will be described in detail based on the following figures, wherein.

DESCRIPTION

An example of an embodiment of an imaging device according to a technique of the disclosure will be described below with reference to accompanying drawings.

In the following description, "perpendicular" refers to perpendicular in terms of including an error within an allowable range. Further, in the following description, "coincidence" refers to coincidence in terms of including an error within an allowable range.

Furthermore, "CPU" is an abbreviation for "Central Processing Unit" in the following description. Moreover, "I/F" is an abbreviation for "Interface" in the following description. Further, "ASIC" is an abbreviation for "Application Specific Integrated Circuit" in the following description. Furthermore, "FPGA" is an abbreviation for "Field-Programmable Gate Array" in the following description.

Further, "RAM" is an abbreviation for "Random Access Memory" in the following description. Furthermore, "EEPROM" is an abbreviation for "Electrically Erasable Programmable Read-Only Memory" in the following description. Moreover, "SSD" is an abbreviation for "Solid State Drive" in the following description. Further, CD-ROM is an abbreviation for "Compact Disc Read Only Memory" in the following description.

Furthermore, "JPEG" is an abbreviation for "Joint Photographic Experts Group" in the following description. Moreover, "MPEG" is an abbreviation for "Moving Picture Experts Group" in the following description. Further, "USB" is an abbreviation for "Universal Serial Bus" in the following description.

Furthermore, CMOS is an abbreviation for "Complementary Metal-Oxide-Semiconductor" in the following description. Further, "AE" is an abbreviation for "Auto Exposure" in the following description. Furthermore, "AF" is an abbreviation for "Auto Focus" in the following description.

First Embodiment

Figure 1:
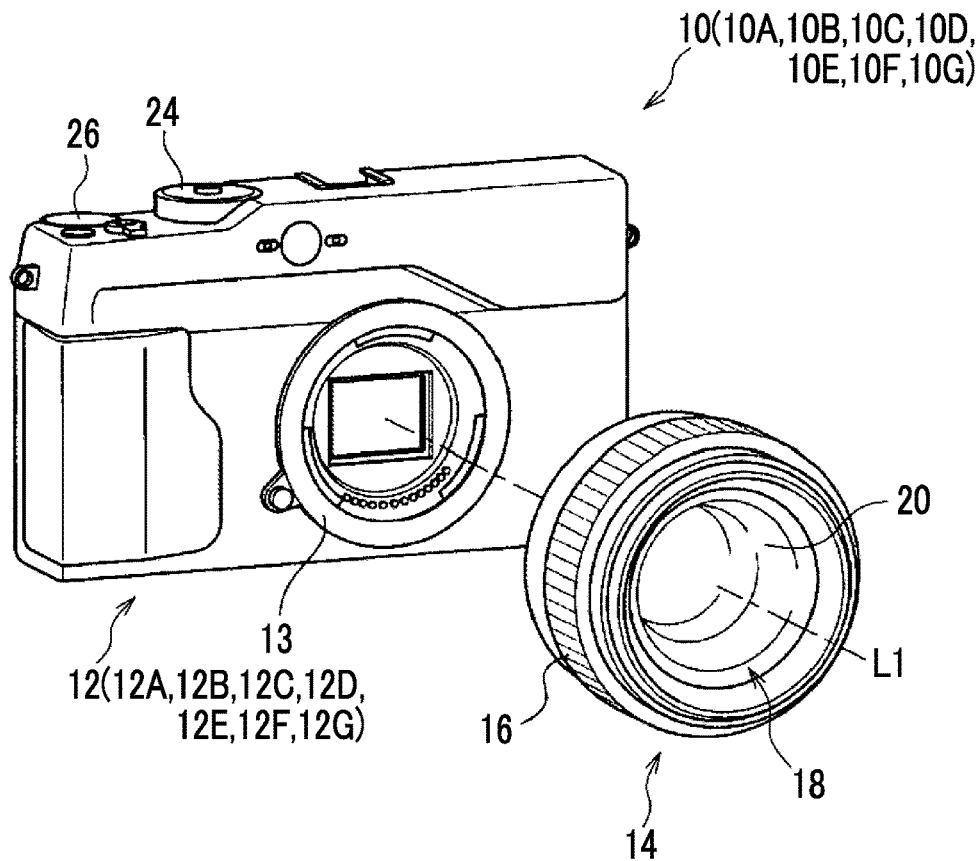
FIG. 1 is a perspective view showing an example of the appearance of imaging devices according to first to eighth embodiments.

As shown in, for example, FIG. 1, an imaging device 10 is a lens-interchangeable digital camera and includes an imaging device body 12 and an imaging lens 14. The imaging lens 14 is mounted on the imaging device body 12 to be interchangeable.

A lens barrel of the imaging lens 14 is provided with a focus ring 16 that is used in a manual focus mode. The imaging lens 14 includes a lens unit 18. The lens unit 18 is a combination lens where a plurality of lenses including a focus lens 20 are combined. The focus lens 20 is moved in the direction of an optical axis L1 with an operation for manually rotating the focus ring 16, and subject light, which is reflected light representing a subject, forms an image on a light-receiving surface 22A (see FIG. 3) of an imaging element 22 to be described later at a focusing position corresponding to a subject distance.

A dial 24 and a release button 26 are provided on the upper surface of the imaging device body 12. The dial 24 is operated in a case where various kinds of setting, such as the switching of an imaging mode and a playback mode, are to be performed. Accordingly, the dial 24 is operated by a user, so that the imaging mode and the playback mode are selectively set as an operating mode in the imaging device 10.

The imaging device 10 has a static image taking mode and a video imaging mode as the operating mode of an imaging system. The static image taking mode is an operating mode where a static image obtained from the imaging of a subject is recorded, and the video imaging mode is an operating mode where a video image obtained from the imaging of a subject is recorded.

The static image taking mode and the video imaging mode are selectively set in the imaging device 10 under the imaging mode according to an instruction that is given to the imaging device 10 from a user. Further, a manual focus mode and an autofocus mode are selectively set in the static image taking mode according to an instruction that is given to the imaging device 10 from a user.

The release button 26 is adapted so that two-stage pressing operations of an imaging-preparation instruction state and an imaging instruction state can be detected. The imaging-preparation instruction state refers to, for example, a state where the release button is pressed down to an intermediate position (half-pressed position) from a stand-by position, and the imaging instruction state refers to a state where the release button is pressed down to a final pressed-down position (fully-pressed position) over the intermediate position. In the following description, "a state where the release button is pressed down to the half-pressed position from the stand-by position" will be referred to as a "half-pressed state" and "a state where the release button is pressed down to the fully-pressed position from the stand-by position" will be referred to as a "fully-pressed state".

In the autofocus mode, the release button 26 is made to be in the half-pressed state to adjust imaging conditions and is then made to be in the fully-pressed state to perform main exposure. That is, in a case where the release button 26 is made to be in the half-pressed state, focusing is controlled by the action of an AF function after an exposure state is set by the action of an AE function. In a case where the release button 26 is made to be in the fully-pressed state, imaging is performed.

Figure 2:
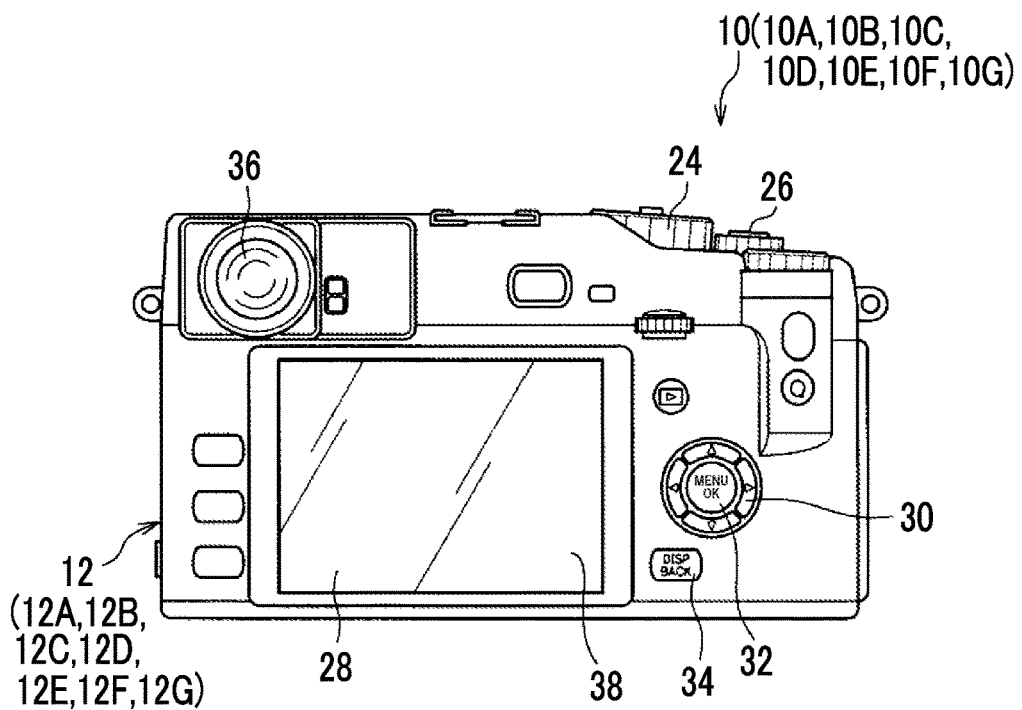
FIG. 2 is a back view showing the back sides of the imaging devices according to the first to eighth embodiments.

As shown in, for example, FIG. 2, a display 28, a cross key 30, a MENU/OK key 32, a BACK/DISP button 34, and a finder 36 are provided on the back of the imaging device body 12.

The display 28 is, for example, an LCD and displays an image that is obtained from the imaging of a subject performed by the imaging device 10, characters, and the like. The display 28 is used for the display of a live view image in the imaging mode. Further, the display 28 is also used for the display of a static image that is obtained from imaging with a single frame in a case where an instruction to take a static image is given. Furthermore, the display 28 is also used for the display of a playback image played back in a playback mode and the display of a menu screen, and the like.

A transmission-type touch panel 38 is laminated on the surface of the display area of the display 28. The touch panel 38 detects contact between itself and a pointer body, such as a finger or a stylus pen. The touch panel 38 outputs detection result information, which represents the result of detection of whether or not the pointer body comes into contact with the touch panel 38, to a predetermined output destination (for example, a CPU 74 (see FIG. 3) to be described later) at a predetermined interval (for example, 100 msec.). The detection result information includes two-dimensional coordinates (hereinafter, referred to as "coordinates") that can specify a contact position on the touch panel 38 where the pointer body comes into contact with the touch panel 38 in a case where the touch panel 38 detects contact between itself and a pointer body, and does not include the coordinates in a case where the touch panel 38 does not detect contact between itself and a pointer body.

The cross key 30 functions as a multifunction key that outputs various command signals for the selection of one or a plurality of menus, zoom, frame advance, and the like. The MENU/OK key 32 is an operation key having both a function as a menu button for giving a command to display one or a plurality of menus on the screen of the display 28 and a function as an OK button for giving a command to determine and perform selected contents and the like. The BACK/DISP button 34 is used for the deletion of a desired object, such as a selected item, the cancellation of designated contents, the return of an operation state to a previous operation state, or the like.

Figure 3:
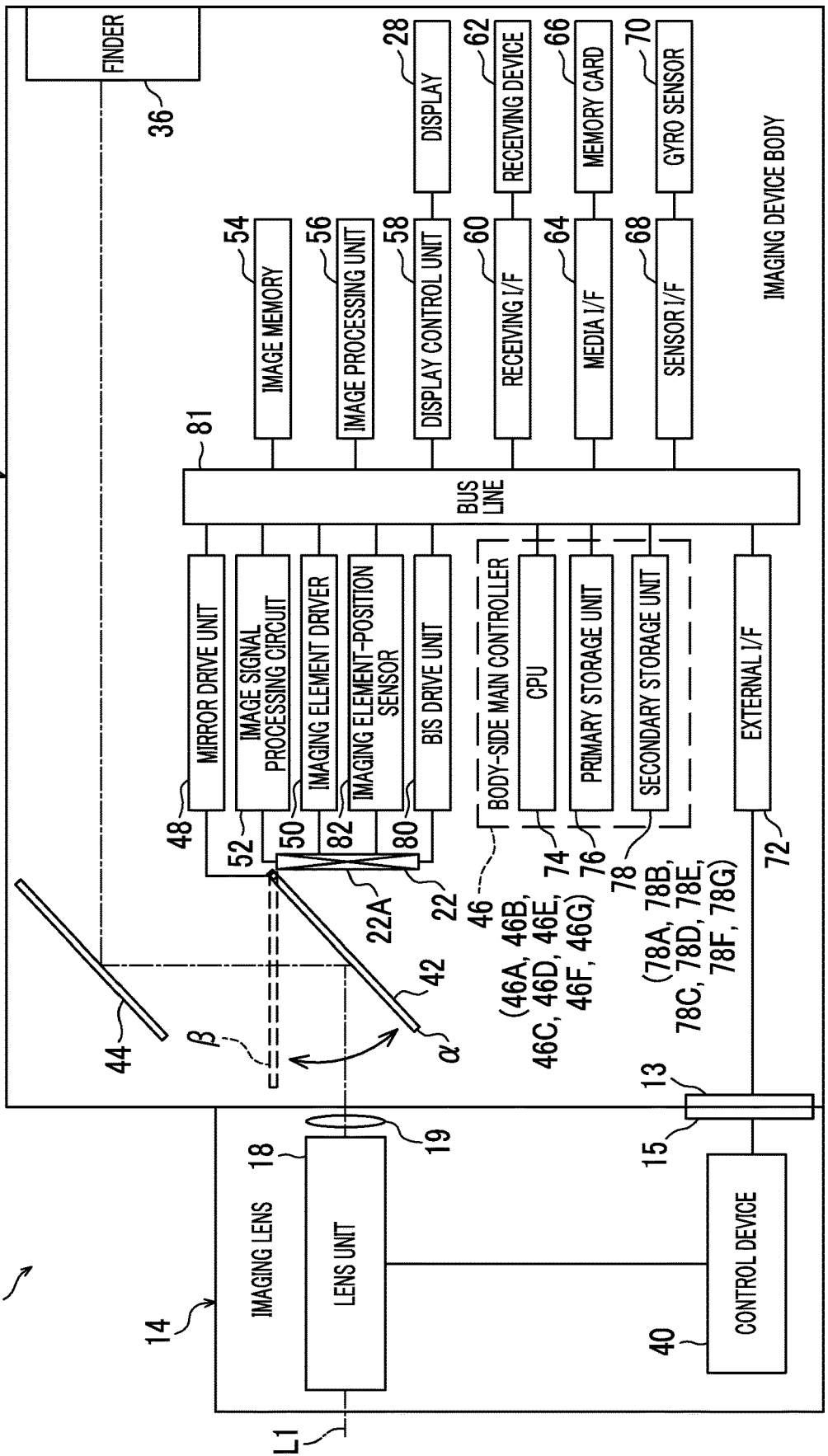
FIG. 3 is a block diagram showing an example of the hardware configuration of the imaging devices according to the first to eighth embodiments.

FIG. 3 is a block diagram of an electrical system showing an example of the hardware configuration of the imaging device 10 according to the first embodiment.

The imaging device body 12 comprises a mount 13 (see also FIG. 1), and the imaging lens 14 comprises a mount 15. The mount 15 is joined to the mount 13, so that the imaging lens 14 is mounted on the imaging device body 12 to be interchangeable.

The imaging lens 14 includes the lens unit 18, a stop 19, and a control device 40. The stop 19 is provided closer to the imaging device body 12 than the lens unit 18, and adjusts the amount of subject light transmitted through the lens unit 18 and guides the subject light into the imaging device body 12.

The control device 40 is electrically connected to the imaging device body 12 through the mounts 13 and 15, and controls the entire imaging lens 14 according to an instruction from the imaging device body 12.

The imaging device body 12 includes an imaging element 22, a first mirror 42, a second mirror 44, a body-side main controller 46, a mirror drive unit 48, an imaging element driver 50, an image signal processing circuit 52, an image memory 54, an image processing unit 56, and a display control unit 58. Further, the imaging device body 12 includes a receiving I/F 60, a receiving device 62, a medium I/F 64, a memory card 66, a sensor I/F 68, a gyro sensor 70, and an external I/F 72. Furthermore, the imaging device body 12 includes a BIS drive unit 80 and an imaging element-position sensor 82. The imaging element 22 is an example of anti-vibration elements according to the technique of the disclosure.

The body-side main controller 46 is an example of a computer according to the technique of the disclosure, and comprises a CPU 74, a primary storage unit 76, and a secondary storage unit 78. The CPU 74 controls the entire imaging device 10. The primary storage unit 76 is a volatile memory that is used as a work area and the like at the time of execution of various programs. Examples of the primary storage unit 76 include a RAM. The secondary storage unit 78 is a non-volatile memory that stores various programs, various parameters, and the like in advance. Examples of the secondary storage unit 78 include an EEPROM, a flash memory, and the like.

The CPU 74, the primary storage unit 76, and the secondary storage unit 78 are connected to a bus line 81. Further, the mirror drive unit 48, the imaging element driver 50, and the image signal processing circuit 52 are also connected to the bus line 81. Furthermore, the image memory 54, the image processing unit 56, the display control unit 58, the receiving I/F 60, the medium I/F 64, and the sensor I/F 68 are also connected to the bus line 81. Moreover, the BIS drive unit 80 and the imaging element-position sensor 82 are also connected to the bus line 81.

The first mirror 42 is a movable mirror that is interposed between the light-receiving surface 22A of the imaging element 22 and the lens unit 18 and is movable between a light-receiving surface covering position α and a light-receiving surface opening position β.

The first mirror 42 is connected to the mirror drive unit 48, and the mirror drive unit 48 drives the first mirror 42 under the control of the CPU 74 to selectively dispose the first mirror 42 at the light-receiving surface covering position α and the light-receiving surface opening position β. That is, the first mirror 42 is disposed at the light-receiving surface covering position α by the mirror drive unit 48 in a case where subject light is not to be received by the light-receiving surface 22A, and is disposed at the light-receiving surface opening position β by the mirror drive unit 48 in a case where subject light is to be received by the light-receiving surface 22A.

At the light-receiving surface covering position α, the first mirror 42 covers the light-receiving surface 22A and reflects the subject light sent from the lens unit 18 to guide the subject light to the second mirror 44. The second mirror 44 reflects subject light, which is guided from the first mirror 42, to guide the subject light to the finder 36 through an optical system (not shown). The finder 36 transmits the subject light that is guided by the second mirror 44.

At the light-receiving surface opening position β, a state where the light-receiving surface 22A is covered with the first mirror 42 is released and subject light is received by the light-receiving surface 22A without being reflected by the first mirror 42.

The imaging element driver 50 is connected to the imaging element 22, and supplies driving pulses to the imaging element 22 under the control of the CPU 74. The respective pixels of the imaging element 22 are driven according to the driving pulses that are supplied by the imaging element driver 50. A CCD image sensor is used as the imaging element 22 in the first embodiment, but the technique of the disclosure is not limited thereto and other image sensors, such as a CMOS image sensor, may be used.

The image signal processing circuit 52 reads image signals corresponding to one frame for each pixel from the imaging element 22 under the control of the CPU 74. The image signal processing circuit 52 performs various kinds of processing, such as correlative double sampling processing, automatic gain control, and A/D conversion, on the read image signals. The image signal processing circuit 52 outputs the image signals, which are digitized by various kinds of processing performed on the image signals, to the image memory 54 for each frame at a specific frame rate (for example, several tens of frames/s) that is regulated according to a clock signal supplied from the CPU 74.

The image memory 54 temporarily keeps the image signals that are input from the image signal processing circuit 52.

The image processing unit 56 acquires image signals from the image memory 54 for each frame at a specific frame rate, and performs various kinds of processing, such as gamma correction, luminance/color difference conversion, and compression processing, on the acquired image signals. Further, the image processing unit 56 outputs the image signals, which are obtained through the various kinds of processing, to the display control unit 58 for each frame at a specific frame rate. Furthermore, the image processing unit 56 outputs the image signals, which are obtained through the various kinds of processing, to the CPU 74 in response to the request of the CPU 74.

The display control unit 58 is connected to the display 28, and controls the display 28 under the control of the CPU 74. Further, the display control unit 58 outputs the image signals, which are input from the image processing unit 56, to the display 28 for each frame at a specific frame rate.

The display 28 displays an image, which is represented by the image signals input from the display control unit 58 at a specific frame rate, as a live view image. Furthermore, the display 28 also displays a static image that is a single frame image obtained from imaging with a single frame. A playback image, a menu screen, and the like are displayed on the display 28 in addition to a live view image.

The receiving device 62 includes the dial 24, the release button 26, the cross key 30, the MENU/OK key 32, the BACK/DISP button 34, the touch panel 38, and the like, and receives various instructions from a user.

The receiving device 62 is connected to the receiving I/F 60 and outputs instruction content signals, which represent the contents of received instructions, to the receiving I/F 60. The receiving I/F 60 outputs the instruction content signals, which are input from the receiving device 62, to the CPU 74. The CPU 74 performs processing corresponding to the instruction content signals that are input from the receiving I/F 60.

The medium I/F 64 is connected to the memory card 66 and records and reads an image file in and from the memory card 66 under the control of the CPU 74. Under the control of the CPU 74, the image file, which is read from the memory card 66 by the medium I/F 64, is subjected to decompression processing by the image processing unit 56 and is displayed on the display 28 as a playback image. The "image file" mentioned here is broadly classified into a static image file representing a static image and a video file representing a video image.

An operating mode is switched in the imaging device 10 according to an instruction that is received by the receiving device 62. For example, the static image taking mode and the video imaging mode are selectively set in the imaging device 10 under the imaging mode according to an instruction that is received by the receiving device 62. A static image file can be recorded in the memory card 66 under the static image taking mode, and a video file can be recorded in the memory card 66 under the video imaging mode.

In a case where an instruction to take a static image is received by the release button 26 under the static image taking mode, the CPU 74 controls the imaging element driver 50 to cause the imaging element 22 to perform main exposure corresponding to one frame. The image processing unit 56 acquires image signals, which are obtained from the exposure corresponding to one frame, under the control of the CPU 74, and performs compression processing on the acquired image signals to generate a static image file having a specific static image format. Here, the specific static image format refers to, for example, a JPEG format. The static image file is recorded in the memory card 66 through the medium I/F 64 by the image processing unit 56 under the control of the CPU 74.

In a case where an instruction to take a video image is received by the release button 26 under the video imaging mode, the image processing unit 56 performs compression processing on image signals for a live view image to generate a video file having a specific video format. Here, the specific video format refers to, for example, a MPEG format. The video file is recorded in the memory card 66 through the medium I/F 64 by the image processing unit 56 under the control of the CPU 74.

The gyro sensor 70 is connected to the sensor I/F 68, detects angular velocities in a yaw direction, a roll direction, and a pitch direction, and outputs angular velocity information, which represents the detected angular velocities, to the sensor I/F 68. The sensor I/F 68 outputs the angular velocity information, which is input from the gyro sensor 70, to the CPU 74. The CPU 74 performs processing corresponding to the angular velocity information that is input from the sensor I/F 68. The angular velocity information is an example of detection results according to the technique of the disclosure.

The BIS drive unit 80 is connected to the imaging element 22, and moves the imaging element 22 under the control of the CPU 74. The imaging element 22 and the BIS drive unit 80 are examples of a suppression unit and an imaging element-side suppression unit according to the technique of the disclosure.

The BIS drive unit 80 moves the imaging element 22 to suppress a shift in the angle of view that is caused by an anti-vibration lens 94 to be described later. Here, the shift in the angle of view refers to a shift in the angle of view of an image that is obtained from imaging performed by the imaging device 10 and is displayed on the display 28.

Further, the BIS drive unit 80 suppresses the influence of vibration, which is applied to the imaging device 10, on a subject image on the basis of the detection results of the gyro sensor 70. The influence of vibration, which is applied to the imaging device 10, on a subject image is broadly classified into a rotation influence and a non-rotation influence. For the convenience of description, the rotation influence and the non-rotation influence will be simply referred to as "blurring influences" in the following description in a case where the rotation influence and the non-rotation influence do not need to be described while being distinguished from each other.

The rotation influence refers to an influence for rotating a subject image about an optical axis L1 among the influences of vibration, which is applied to the imaging device 10, on the subject image. The non-rotation influence refers to an influence different from the rotation influence among the influences of vibration, which is applied to the imaging device 10, on the subject image.

The BIS drive unit 80 includes a driving source (not shown) for an imaging element that generates power to be applied to the imaging element 22. Examples of the driving source for an imaging element include a magnet, a flat coil, and a stepping motor.

The rotation influence-suppression processing means processing referred to as so-called roll correction, and refers to processing for suppressing the rotation influence by rotating the imaging element 22 about the optical axis L1 on the basis of the detection results of the gyro sensor 70. In contrast, the non-rotation influence-suppression processing refers to processing for suppressing the non-rotation influence by moving the imaging element 22 straight in a first predetermined plane on the basis of the detection results of the gyro sensor 70. Here, "in a first predetermined plane" refers to, for example, "in a two-dimensional plane" perpendicular to the optical axis L1 in a state where vibration is not applied to the imaging device 10. For the convenience of description, the rotation influence-suppression processing and the non-rotation influence-suppression processing to be performed by the BIS drive unit 80 will be referred to as "BIS processing" in the following description in a case where the rotation influence-suppression processing and the non-rotation influence-suppression processing do not need to be described while being distinguished from each other.

The imaging element-position sensor 82 includes, for example, a magnet and a hall element, and detects the position of the imaging element 22 in the first predetermined plane and outputs imaging element-position information, which represents the detected position, to the CPU 74. The CPU 74 calculates imaging element-destination information which represents a destination where the blurring influence can be suppressed as the destination of the imaging element 22 in the BIS processing, that is, the destination of the imaging element 22 in the first predetermined plane by using the angular velocity information and the imaging element-position information. Then, the CPU 74 outputs the calculated imaging element-destination information to the BIS drive unit 80. The BIS drive unit 80 performs the BIS processing on the basis of the imaging element-destination information that is input from the CPU 74. That is, the BIS drive unit 80 moves the imaging element 22 to a destination, which is represented by the imaging element-destination information input from the CPU 74, in the first predetermined plane.

In a case where the mount 15 is connected to the mount 13, the external I/F 72 is connected to the control device 40 of the imaging lens 14 and takes charge of the transmission and reception of various kinds of information between the CPU 74 and the control device 40.

Figure 4:
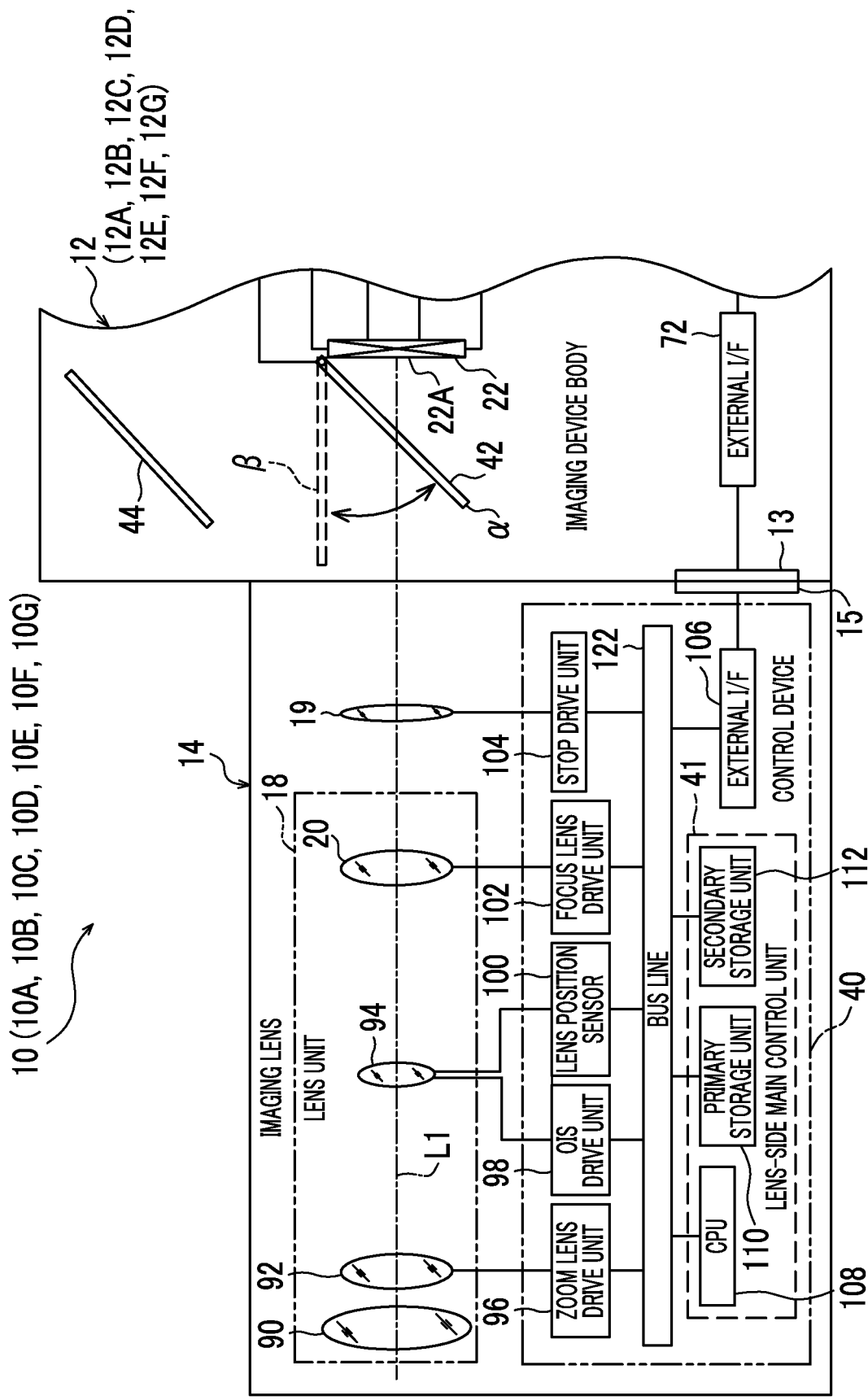
FIG. 4 is a block diagram showing an example of the hardware configuration of imaging lenses that are included in the imaging devices according to the first to eighth embodiments.

As shown in, for example, FIG. 4, the lens unit 18 includes an incident lens 90, a zoom lens 92, an anti-vibration lens 94, and a focus lens 20. The anti-vibration lens 94 is an example of the anti-vibration elements according to the technique of the disclosure.

The incident lens 90, the zoom lens 92, the anti-vibration lens 94, and the focus lens 20 are arranged along the optical axis L1; and the focus lens 20, the anti-vibration lens 94, the zoom lens 92, and the incident lens 90 are arranged along the optical axis L1 in this order from the stop 19.

Subject light is incident on the incident lens 90. The incident lens 90 transmits the subject light and guides the subject light to the zoom lens 92. The zoom lens 92 is a lens, which is movable along the optical axis L1, and is moved along the optical axis L1 to change the magnification of a subject image. The zoom lens 92 transmits the subject light, which is incident from the incident lens 90, and guides the subject light to the anti-vibration lens 94.

The anti-vibration lens 94 is a lens, which is movable in a direction where image blur is to be offset (for example, a direction perpendicular to the optical axis L1), and transmits the subject light, which is incident from the zoom lens 92, and guides the subject light to the focus lens 20.

The focus lens 20 is a lens, which is movable along the optical axis L1, and is moved along the optical axis L1 to change the focus state of a subject image that is formed on the light-receiving surface 22A of the imaging element 22. The focus lens 20 transmits the subject light, which is incident from the anti-vibration lens 94, and guides the subject light to the stop 19. The stop 19 adjusts the amount of the subject light that is incident from the anti-vibration lens 94, transmits the subject light, and guides the subject light to the imaging device body 12.

The control device 40 includes a lens-side main control unit 41, a zoom lens drive unit 96, an OIS drive unit 98, a lens position sensor 100, a focus lens drive unit 102, a stop drive unit 104, and an external I/F 106.

The lens-side main control unit 41 comprises a CPU 108, a primary storage unit 110, and a secondary storage unit 112. The CPU 108 controls the entire imaging lens 14. The primary storage unit 110 is a volatile memory that is used as a work area and the like at the time of execution of various programs. Examples of the primary storage unit 110 include a RAM. The secondary storage unit 112 is a non-volatile memory that stores various programs, various parameters, and the like in advance. Examples of the secondary storage unit 112 include an EEPROM, a flash memory, and the like.

The CPU 108, the primary storage unit 110, and the secondary storage unit 112 are connected to a bus line 122. Further, the zoom lens drive unit 96, the OIS drive unit 98, the lens position sensor 100, the focus lens drive unit 102, the stop drive unit 104, and the external I/F 106 are also connected to the bus line 122.

In a case where the mount 15 is connected to the mount 13, the external I/F 106 is connected to the external I/F 72 of the imaging device body 12 and takes charge of the transmission and reception of various kinds of information between the CPU 108 and the CPU 74 of the imaging device body 12 in cooperation with the external I/F 72.

The zoom lens drive unit 96 includes a zoom lens-driving motor (not shown), and moves the zoom lens 92 along the optical axis L1 by operating the zoom lens-driving motor under the control of the CPU 108 according to an instruction that is received by the receiving device 62. That is, the zoom lens drive unit 96 moves the zoom lens 92 along the optical axis L1 by operating the zoom lens-driving motor according to an instruction from the CPU 108 to transmit the power of the zoom lens-driving motor to the zoom lens 92.

The OIS drive unit 98 includes a driving source (not shown) for an anti-vibration lens that generates power to be applied to the anti-vibration lens 94. Examples of the driving source for an anti-vibration lens include a magnet and a flat coil. The OIS drive unit 98 suppresses the non-rotation influence by moving the anti-vibration lens 94 straight in a second predetermined plane under the control of the CPU 108 on the basis of the detection results of the gyro sensor 70. Here, "in a second predetermined plane" refers to, for example, "in a two-dimensional plane" perpendicular to the optical axis L1 in a state where vibration is not applied to the imaging device 10.

The anti-vibration lens 94 and the OIS drive unit 98 are examples of a suppression unit and a lens-side suppression unit according to the technique of the disclosure. Further, for the convenience of description, processing for suppressing the non-rotation influence by the OIS drive unit 98 will be referred to as "OIS processing" in the following description. Furthermore, for the convenience of description, the BIS processing and the OIS processing will be referred to as "influence-suppression processing" in the following description in a case where the BIS processing and the OIS processing do not need to be described while being distinguished from each other.

The lens position sensor 100 includes, for example, a magnet and a hall element, and detects the position of the anti-vibration lens 94 in the second predetermined plane and outputs lens position information, which represents the detected position, to the CPU 108. The CPU 108 calculates lens destination information by using the lens position information and the angular velocity information that is acquired from the imaging device body 12 through the external I/F 106. The lens destination information refers to information that represents a destination where the non-rotation influence can be suppressed as the destination of the anti-vibration lens 94 in the OIS processing, that is, the destination of the anti-vibration lens 94 in the second predetermined plane. Then, the CPU 108 outputs the calculated lens destination information to the OIS drive unit 98. The OIS drive unit 98 moves the anti-vibration lens 94 to a destination that is represented by the lens destination information input from the CPU 108.

The focus lens drive unit 102 includes a focus lens-driving motor (not shown). The focus lens drive unit 102 moves the focus lens 20 along the optical axis L1 by operating the focus lens-driving motor under the control of the CPU 108 according to an instruction that is received by the receiving device 62. That is, the focus lens drive unit 102 moves the focus lens 20 along the optical axis L1 by operating the focus lens-driving motor according to an instruction from the CPU 108 to transmit the power of the focus lens-driving motor to the focus lens 20.

The stop drive unit 104 includes a stop-driving motor (not shown). The stop drive unit 104 adjusts the size of the aperture of the stop 19 by operating the stop-driving motor under the control of the CPU 108 according to an instruction that is received by the receiving device 62.

Figure 5:
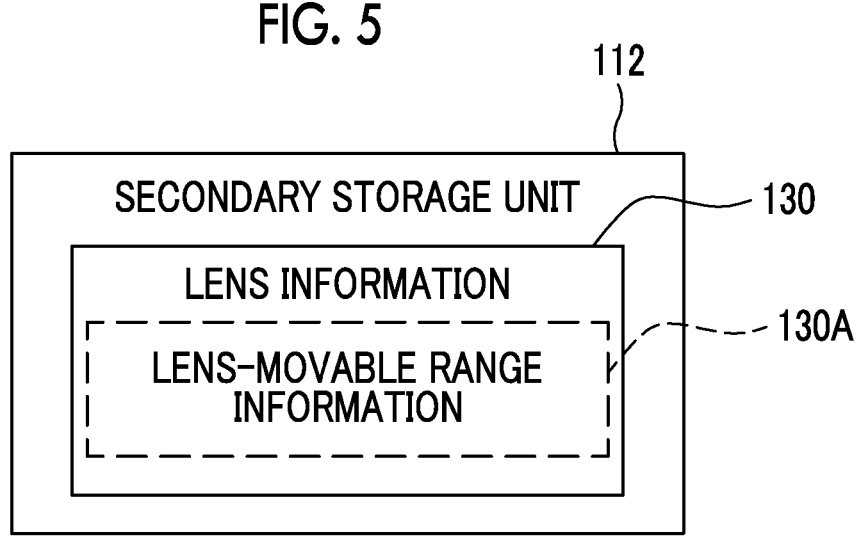
FIG. 5 is a conceptual diagram showing an example of contents stored in secondary storage units of lens-side main control units that are included in the imaging lenses of the imaging devices according to the first to eighth embodiments.

As shown in, for example, FIG. 5, the secondary storage unit 112 of the lens-side main control unit 41 stores lens information 130.

The lens information 130 is information relating to the characteristics of the imaging lens 14, and is transmitted to the CPU 74 of the imaging device body 12 from the CPU 108 in a case where the imaging lens 14 is connected to the imaging device body 12 through the mounts 13 and 15.

The lens information 130 includes lens-movable range information 130A. The lens-movable range information 130A is information that represents an anti-vibration lens-movable range. The anti-vibration lens-movable range is the maximum movable range of the anti-vibration lens 94 in the second predetermined plane. In the first embodiment, the movable range is synonymous with an allowed stroke.

Further, the lens information 130 also includes the focal length of the lens unit 18 (hereinafter, simply referred to as a "focal length"), lens position information, zoom lens position information, focus lens information, and the like. The zoom lens position information refers to information that represents the position of the zoom lens 92 on the optical axis L1. The focus lens information refers to information that represents the position of the focus lens 20 on the optical axis L1. Furthermore, the lens information 130 also includes physical quantities that represent the optical characteristics of the peripheral area of the lens unit 18.

Here, the amount of ambient light and the peripheral resolution of the lens unit 18 are employed as examples of the physical quantities representing the optical characteristics of the peripheral area of the lens unit 18, but the technique of the disclosure is not limited thereto. For example, the physical quantities representing the optical characteristics of the peripheral area of the lens unit 18 may be the amount of ambient light or the peripheral resolution of the lens unit 18.

The amount of ambient light of the lens unit 18 refers to the amount of light in the peripheral area of an image circle formed by the lens unit 18. The peripheral area of the image circle refers to an annular area of the image circle other than a circular area that has a radius corresponding to 80% of the radius of the image circle from the center of the image circle in a radial direction. Further, the peripheral resolution refers to a resolution that can be obtained from the amount of ambient light of the lens unit 18.

For the convenience of description, the amount of ambient light is expressed by a percentage as a ratio of the amount of ambient light to the amount of light at the center of the image circle in the following description in a case where the amount of light at the center of the image circle is assumed as 100%.

Figure 6:
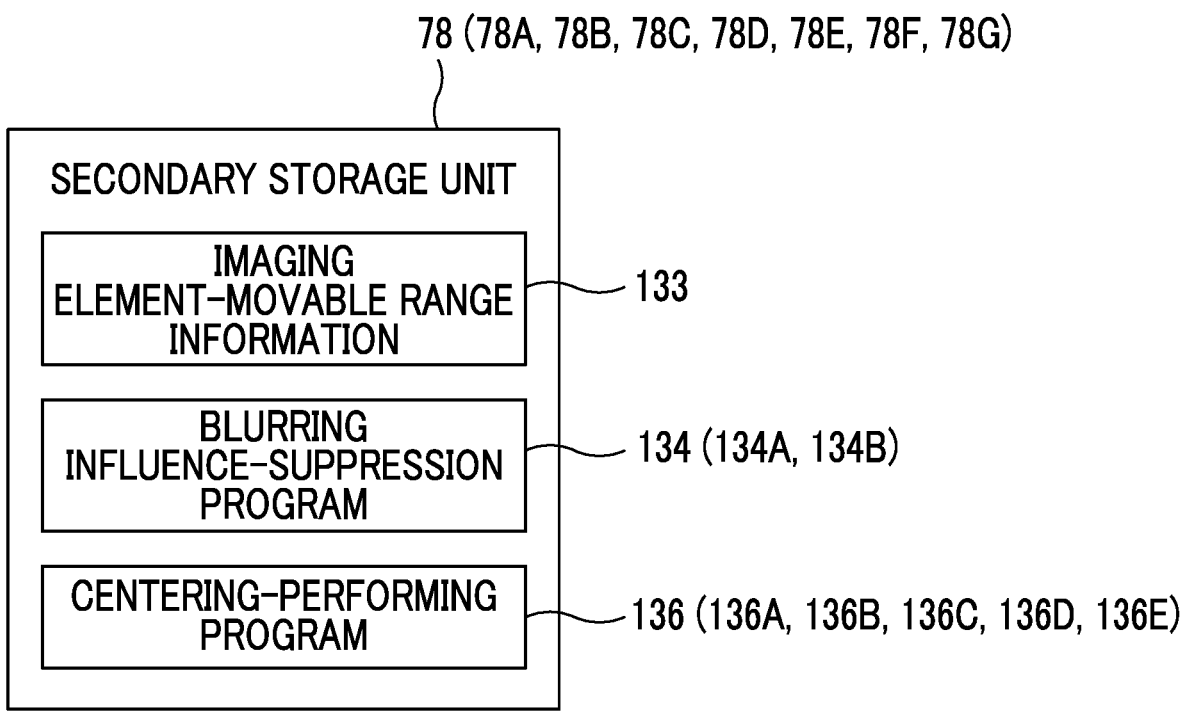
FIG. 6 is a conceptual diagram showing an example of contents stored in secondary storage units of body-side main controllers that are included in imaging device bodies of the imaging devices according to the first to eighth embodiments.

As shown in, for example, FIG. 6, the secondary storage unit 78 of the body-side main controller 46 stores imaging element-movable range information 133, a blurring influence-suppression program 134, and a centering-performing program 136.

The imaging element-movable range information 133 is information that represents an imaging element-movable range. The imaging element-movable range refers to the maximum movable range of the imaging element 22 in the first predetermined plane.

The CPU 74 reads the blurring influence-suppression program 134 from the secondary storage unit 78, develops the blurring influence-suppression program 134 in the primary storage unit 76, and performs blurring influence-suppression processing (see FIGS. 7 and 8) to be described later according to the developed blurring influence-suppression program 134. In other words, the CPU 74 operates as a control unit according to the technique of the disclosure by executing the blurring influence-suppression program 134.

The CPU 74 reads the centering-performing program 136 from the secondary storage unit 78, develops the centering-performing program 136 in the primary storage unit 76, and performs centering-performing processing (see FIG. 9) to be described later according to the developed centering-performing program 136. In other words, the CPU 74 operates as a control unit according to the technique of the disclosure by executing the centering-performing program 136.

Accordingly, the CPU 74 performs control on the display 28 to display a live view image and performs control on the BIS drive unit 80 and the OIS drive unit 98 to center the anti-vibration elements in a predetermined period.

Here, the "anti-vibration elements" refer to the imaging element 22 and the anti-vibration lens 94. The imaging element 22 and the anti-vibration lens 94 will be referred to as "anti-vibration elements" in the following description in a case where the imaging element 22 and the anti-vibration lens 94 do not need to be described while being distinguished from each other.

Here, the "predetermined period" refers to a period where an operation for displaying a live view image by the display 28 is being performed and a visibility-obstruction phenomenon occurs in a state where the influence-suppression processing is being performed.

Here, the visibility-obstruction phenomenon refers to a phenomenon that is predetermined as a phenomenon where the visual recognition of a shift in the angle of view caused by the centering of the anti-vibration elements can be obstructed. In other words, "a phenomenon where the visual recognition of a shift in the angle of view can be obstructed" means a phenomenon where a user is caused not to visually perceive a shift in the angle of view from the image displayed on the display 28. In the first embodiment, a blackout is employed as an example of the visibility-obstruction phenomenon. A blackout refers to a phenomenon where a screen is temporarily darkened in a case where the release button 26 is pressed down to the final pressed-down position under the imaging mode.

Here, "centering" about the anti-vibration elements refers to an operation for returning the anti-vibration elements to reference positions that are home positions of the anti-vibration elements. The reference positions are broadly classified into a first reference position that is the home position of the anti-vibration lens 94 and a second reference position that is the home position of the imaging element 22. "First reference position" refers to the position of the anti-vibration lens 94 in a state where vibration is not applied to the imaging device 10. "Second reference position" refers to the position of the imaging element 22 in a state where vibration is not applied to the imaging device 10.

Accordingly, "centering" about the anti-vibration lens 94 refers to an operation for returning the anti-vibration lens 94 to the first reference position. Further, "centering" about the imaging element 22 refers to an operation for returning the imaging element 22 to the second reference position that is the home position of the imaging element 22.

The reason why the centering of the anti-vibration elements is required in this way is that there is a concern that the quality of an image obtained from the imaging of a subject performed by the imaging device 10 (hereinafter, simply referred to as "image quality") may deteriorate depending on the positions of the anti-vibration elements. For example, since subject light is refracted in a case where the anti-vibration lens 94 is moved, aberration in a case where the anti-vibration lens 94 is disposed at the reference position is different from aberration in a case where the anti-vibration lens 94 is disposed at a position away from the reference position. As a result, since there is a concern that image quality may deteriorate, centering is required.

Next, the blurring influence-suppression processing shown in FIGS. 7 and 8 and the centering-performing processing shown in FIG. 9 will be described as the actions of parts of the imaging device 10 according to the technique of the disclosure.

Description will be made below in the description of the blurring influence-suppression processing and the centering-performing processing according to the first embodiment on the premise that the video imaging mode is already set in the imaging device 10. Further, the recording of a video image is started in the imaging device 10 in a case where the release button 26 is pressed down to the final pressed-down position under the video imaging mode, and the recording of a video image is ended in a case where the release button 26 is pressed down to the final pressed-down position again during the recording of the video image. Here, "the recording of a video image" refers to, for example, the recording of a video image, which is obtained from imaging, in the memory card 66.

Furthermore, for the convenience of description, description will be made below on the premise that the imaging element 22 and the anti-vibration lens 94 have been already centered and the influence-suppression processing is not yet performed at a time when the blurring influence-suppression processing and the centering-performing processing according to the first embodiment start to be performed. "The imaging element 22 and the anti-vibration lens 94 have been already centered" means that the anti-vibration lens 94 is disposed at the first reference position and the imaging element 22 is disposed at the second reference position.

Here, the blurring influence-suppression processing, which is performed by the CPU 74 in a case where the power supply of the imaging device 10 is turned on (power is supplied to the imaging device 10) in a state where the imaging lens 14 is connected to the imaging device body 12 through the mounts 13 and 15, will be described first with reference to FIGS. 7 and 8.

Figure 7:
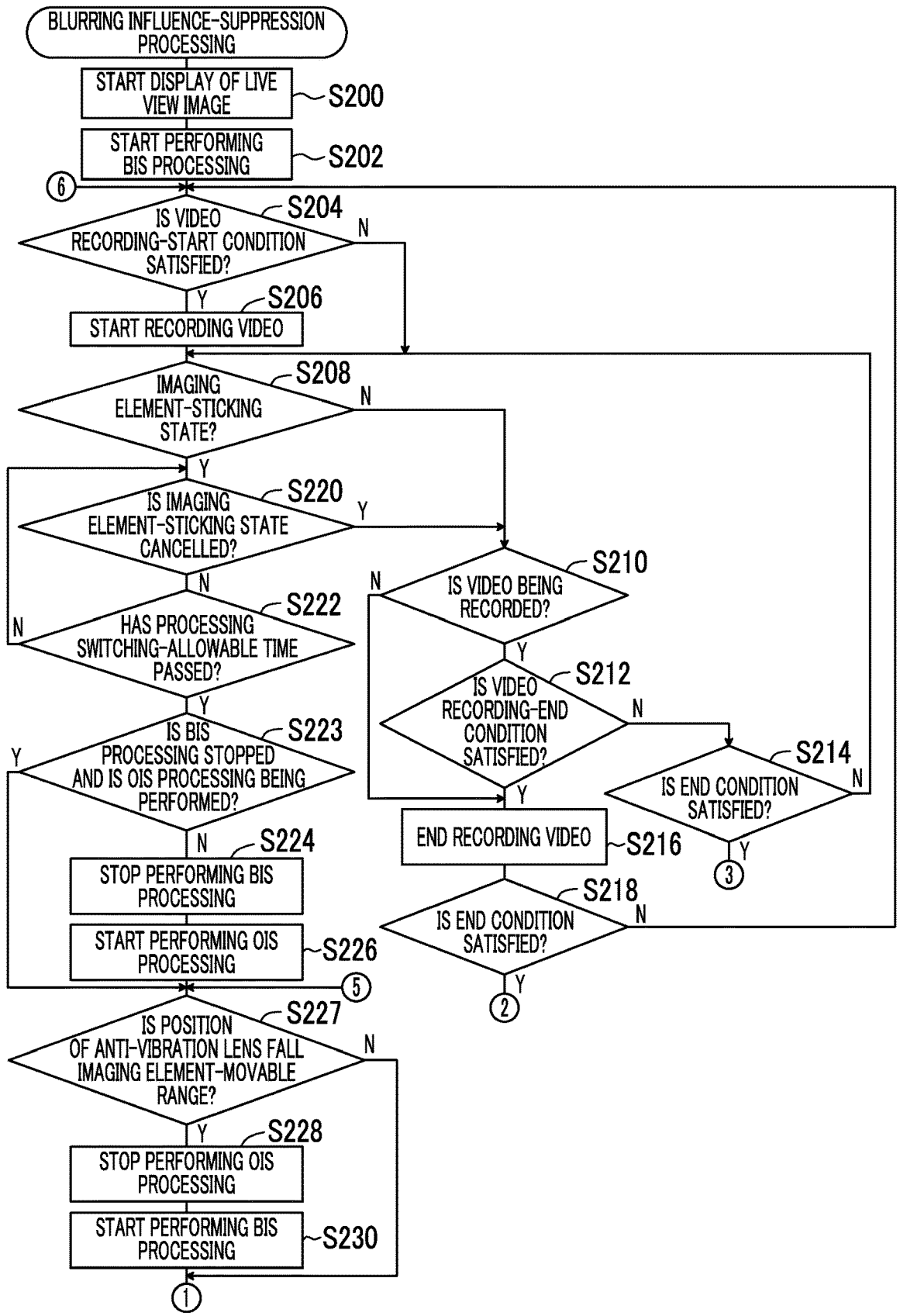
FIG. 7 is a flowchart showing an example of the flow of blurring influence-suppression processing according to the first embodiment.

In the blurring influence-suppression processing shown in FIG. 7, the CPU 74 causes the display 28 to start the display of a live view image based on an image obtained from imaging performed by the imaging device 10 in Step 200 first and the processing then proceeds to Step 202.

The CPU 74 causes the BIS drive unit 80 to start performing the BIS processing in Step 202, and the processing then proceeds to Step 204.

In Step 204, the CPU 74 determines whether or not a video recording-start condition, which is a condition where the recording of a video image is to be started, is satisfied. Here, a condition where the release button 26 is pressed down to the final pressed-down position is used as an example of the video recording-start condition. Further, a condition where an instruction to start the recording of a video image is received by the touch panel 38 is used as another example of the video recording-start condition.

In a case where the video recording-start condition is satisfied in Step 204, the determination is positive and the processing proceeds to Step 206. In a case where the video recording-start condition is not satisfied in Step 204, the determination is negative and the processing proceeds to Step 208.

The CPU 74 causes the image processing unit 56 and the medium I/F 64 to start recording a video image in Step 206, and the processing then proceeds to Step 208.

In Step 208, first, the CPU 74 acquires imaging element-position information from the imaging element-position sensor 82 and acquires the imaging element-movable range information 133 from the secondary storage unit 78. Then, the CPU 74 determines whether or not the imaging element 22 is in an imaging element-sticking state with reference to the imaging element-position information and the imaging element-movable range information 133.

Here, the "imaging element-sticking state" refers to a state where the imaging element 22 reaches a limit position in the first predetermined plane. Here, "a limit position in the first predetermined plane" refers to the limit position of the imaging element-movable range that is represented by the imaging element-movable range information 133. "The limit position of the imaging element-movable range" means the upper limit position and the lower limit position of the imaging element-movable range, that is, the upper limit position and the lower limit position of the maximum stroke that is allowed for the imaging element 22.

In a case where the imaging element 22 is not in the imaging element-sticking state in Step 208, the determination is negative and the processing proceeds to Step 210. In a case where the imaging element 22 is in the imaging element-sticking state in Step 208, the determination is positive and the processing proceeds to Step 220.

In Step 210, the CPU 74 determines whether or not a video image is being recorded. In a case where a video image is being recorded in Step 210, the determination is positive and the processing proceeds to Step 212. In a case where a video image is not being recorded in Step 210, the determination is negative and the processing proceeds to Step 218.

In Step 212, the CPU 74 determines whether or not a video recording-end condition, which is a condition where the recording of a video image is to end, is satisfied. Here, a condition where the release button 26 is pressed down to the final pressed-down position is used as an example of the video recording-end condition. Further, a condition where an instruction to end the recording of a video image is received by the touch panel 38 is used as another example of the video recording-end condition. Furthermore, a condition where a first predetermined time (for example, 60 sec.) has passed without the receipt of the instruction by the receiving device 62 after the video imaging mode is set in the imaging device 10 is used as another example of the video recording-end condition.

In a case where the video recording-end condition is not satisfied in Step 212, the determination is negative and the processing proceeds to Step 214. In a case where the video recording-end condition is satisfied in Step 212, the determination is positive and the processing proceeds to Step 216.

In Step 214, the CPU 74 determines whether or not an end condition, which is a condition where the blurring influence-suppression processing is to end, is satisfied. A condition where an instruction to end the blurring influence-suppression processing is received by the receiving device 62 is used as an example of the end condition according to the blurring influence-suppression processing. Further, a condition where a first predetermined time (for example, 120 sec.) has passed without the receipt of the instruction by the receiving device 62 after the blurring influence-suppression processing starts to be performed is used as another example of the end condition according to the blurring influence-suppression processing.

In a case where the end condition according to the blurring influence-suppression processing is not satisfied in Step 214, the determination is negative and the processing proceeds to Step 208. In a case where the end condition according to the blurring influence-suppression processing is satisfied in Step 214, the determination is positive and the processing proceeds to Step 250 shown in FIG. 8.

The CPU 74 causes the image processing unit 56 and the medium I/F 64 to end recording a video image in Step 216, and the processing then proceeds to Step 218.

In Step 218, the CPU 74 determines whether or not the end condition according to the blurring influence-suppression processing is satisfied. In a case where the end condition according to the blurring influence-suppression processing is not satisfied in Step 218, the determination is negative and the processing proceeds to Step 204. In a case where the end condition according to the blurring influence-suppression processing is satisfied in Step 218, the determination is positive and the processing proceeds to Step 258 shown in FIG. 8.

In Step 220, first, the CPU 74 acquires imaging element-position information from the imaging element-position sensor 82 and acquires the imaging element-movable range information 133 from the secondary storage unit 78. Then, the CPU 74 determines whether or not the imaging element-sticking state is cancelled with reference to the imaging element-position information and the imaging element-movable range information 133. "The imaging element-sticking state is cancelled" refers to a state where the imaging element 22 is present at a position other than the limit position in the imaging element-movable range.

In a case where the imaging element-sticking state is cancelled in Step 220, the determination is positive and the processing proceeds to Step 210. In a case where the imaging element-sticking state is not cancelled in Step 220, the determination is negative and the processing proceeds to Step 222.

In Step 222, the CPU 74 determines whether or not a processing switching-allowable time has passed without the cancellation of the imaging element-sticking state after the determination of Step 208 becomes positive. Here, the processing switching-allowable time refers to a time (for example, 5 sec.) that is predetermined as a time when the switching of processing to the OIS processing from the BIS processing is allowed. "The switching of processing to the OIS processing from the BIS processing" means that the BIS processing is stopped and the OIS processing starts to be performed.

In a case where the processing switching-allowable time has not passed without the cancellation of the imaging element-sticking state after the determination of Step 208 becomes positive in Step 222, the determination is negative and the processing proceeds to Step 220. In a case where the processing switching-allowable time has passed without the cancellation of the imaging element-sticking state after the determination of Step 208 becomes positive in Step 222, the determination is positive and the processing proceeds to Step 223.

In Step 223, the CPU 74 determines whether or not the BIS processing is stopped and the OIS processing is being performed.

In the blurring influence-suppression processing, the BIS processing or the OIS processing is performed until the end condition according to the blurring influence-suppression processing is satisfied after the processing of Step 202 is performed. Accordingly, a case where the determination is negative in Step 223 means a case where the BIS processing is being performed and the OIS processing is stopped.

In a case where the BIS processing is stopped and the OIS processing is being performed in Step 223, the determination is positive and the processing proceeds to Step 227. In a case where the BIS processing is being performed and the OIS processing is stopped in Step 223, the determination is negative and the processing proceeds to Step 224.

The CPU 74 causes the BIS drive unit 80 to stop performing the BIS processing in Step 224, and the processing then proceeds to Step 226.

The CPU 74 causes the OIS drive unit 98 to start performing the OIS processing through the CPU 108 in Step 226, and the processing then proceeds to Step 227.

Since the processing of Steps 224 and 226 is performed in this way, the OIS processing is performed to be more dominant than the BIS processing.

In Step 227, first, the CPU 74 acquires lens position information from the lens position sensor 100 of the imaging lens 14 through the CPU 108 and acquires the imaging element-movable range information 133 from the secondary storage unit 78. Then, the CPU 74 determines whether or not the position of the anti-vibration lens 94 falls within a movable range corresponding to the imaging element-movable range with reference to the lens position information and the imaging element-movable range information 133. "A movable range corresponding to the imaging element-movable range" means a movable range corresponding to the imaging element-movable range in the second predetermined plane. In other words, "a movable range corresponding to the imaging element-movable range" means a stroke that is required for the movement of the anti-vibration lens 94 in the second predetermined plane and is the same as the maximum stroke allowed for the imaging element 22.

Figure 8:
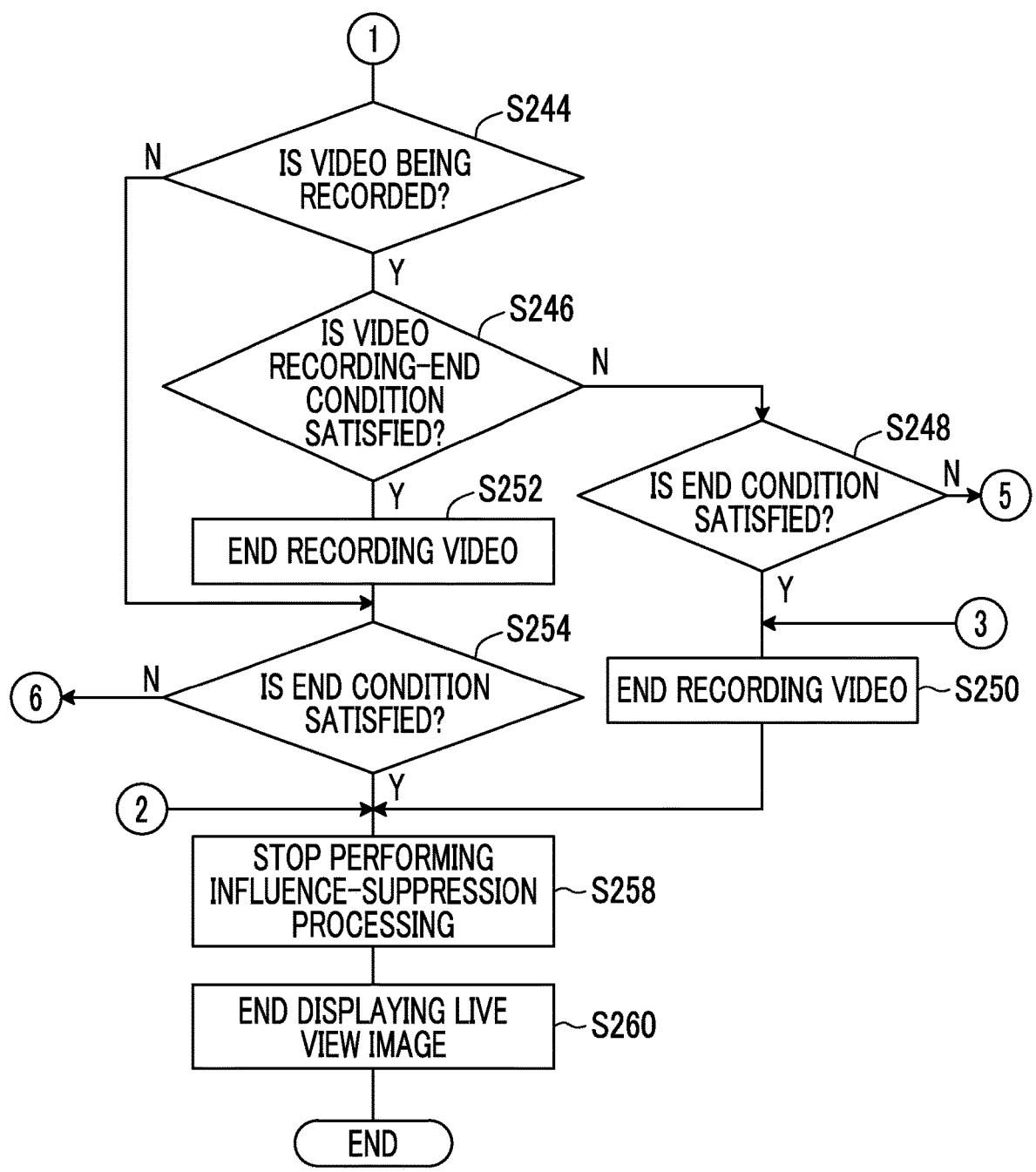
FIG. 8 is a continuation of the flowcharts shown in FIGS. 7 and 10.

In a case where the position of the anti-vibration lens 94 does not fall within the imaging element-movable range in Step 227, the determination is negative and the processing proceeds to Step 244 shown in FIG. 8. In a case where the position of the anti-vibration lens 94 falls within the imaging element-movable range in Step 227, the determination is positive and the processing proceeds to Step 228.

The CPU 74 causes the OIS drive unit 98 to stop performing the OIS processing through the CPU 108 in Step 228, and the processing then proceeds to Step 230.

The CPU 74 causes the BIS drive unit 80 to start performing the BIS processing in Step 230, and the processing then proceeds to Step 244 shown in FIG. 8.

In Step 244 shown in FIG. 8, the CPU 74 determines whether or not a video image is being recorded. In a case where a video image is being recorded in Step 244, the determination is positive and the processing proceeds to Step 246. In a case where a video image is not being recorded in Step 244, the determination is negative and the processing proceeds to Step 254.

In Step 246, the CPU 74 determines whether or not the video recording-end condition is satisfied. In a case where the video recording-end condition is not satisfied in Step 246, the determination is negative and the processing proceeds to Step 248. In a case where the video recording-end condition is satisfied in Step 246, the determination is positive and the processing proceeds to Step 252.

In Step 248, the CPU 74 determines whether or not the end condition according to the blurring influence-suppression processing is satisfied. In a case where the end condition according to the blurring influence-suppression processing is not satisfied in Step 248, the determination is negative and the processing proceeds to Step 227 shown in FIG. 7. In a case where the end condition according to the blurring influence-suppression processing is satisfied in Step 248, the determination is positive and the processing proceeds to Step 250.

The CPU 74 causes the image processing unit 56 and the medium I/F 64 to end recording a video image in Step 250, and the processing then proceeds to Step 258.

The CPU 74 causes the image processing unit 56 and the medium I/F 64 to end recording a video image in Step 252, and the processing then proceeds to Step 254.

In Step 254, the CPU 74 determines whether or not the end condition according to the blurring influence-suppression processing is satisfied. In a case where the end condition according to the blurring influence-suppression processing is not satisfied in Step 254, the determination is negative and the processing proceeds to Step 204 shown in FIG. 7. In a case where the end condition according to the blurring influence-suppression processing is satisfied in Step 254, the determination is positive and the processing proceeds to Step 258.

In Step 258, the CPU 74 causes the BIS drive unit 80 and the OIS drive unit 98 to stop performing the influence-suppression processing. That is, in a case where the OIS processing is currently performed, the CPU 74 causes the OIS drive unit 98 to stop performing the OIS processing. Further, in a case where the BIS processing is currently performed, the CPU 74 causes the BIS drive unit 80 to stop performing the BIS processing.

The CPU 74 causes the display 28 to end displaying a live view image in the next step 260, and the blurring influence-suppression processing then ends.

Next, the centering-performing processing, which is performed by the CPU 74 in a case where a centering-performing processing-start condition is satisfied in a state where the blurring influence-suppression processing shown in FIG. 7 is performed, will be described with reference to FIG. 9. Here, a condition where an instruction to start the centering-performing processing is received by the receiving device 62 is used as an example of the centering-performing processing-start condition. Further, a condition where a second predetermined time (for example, 5 sec.) has passed after the blurring influence-suppression processing shown in FIG. 7 starts to be performed is used as another example of the centering-performing processing-start condition.

Figure 9:
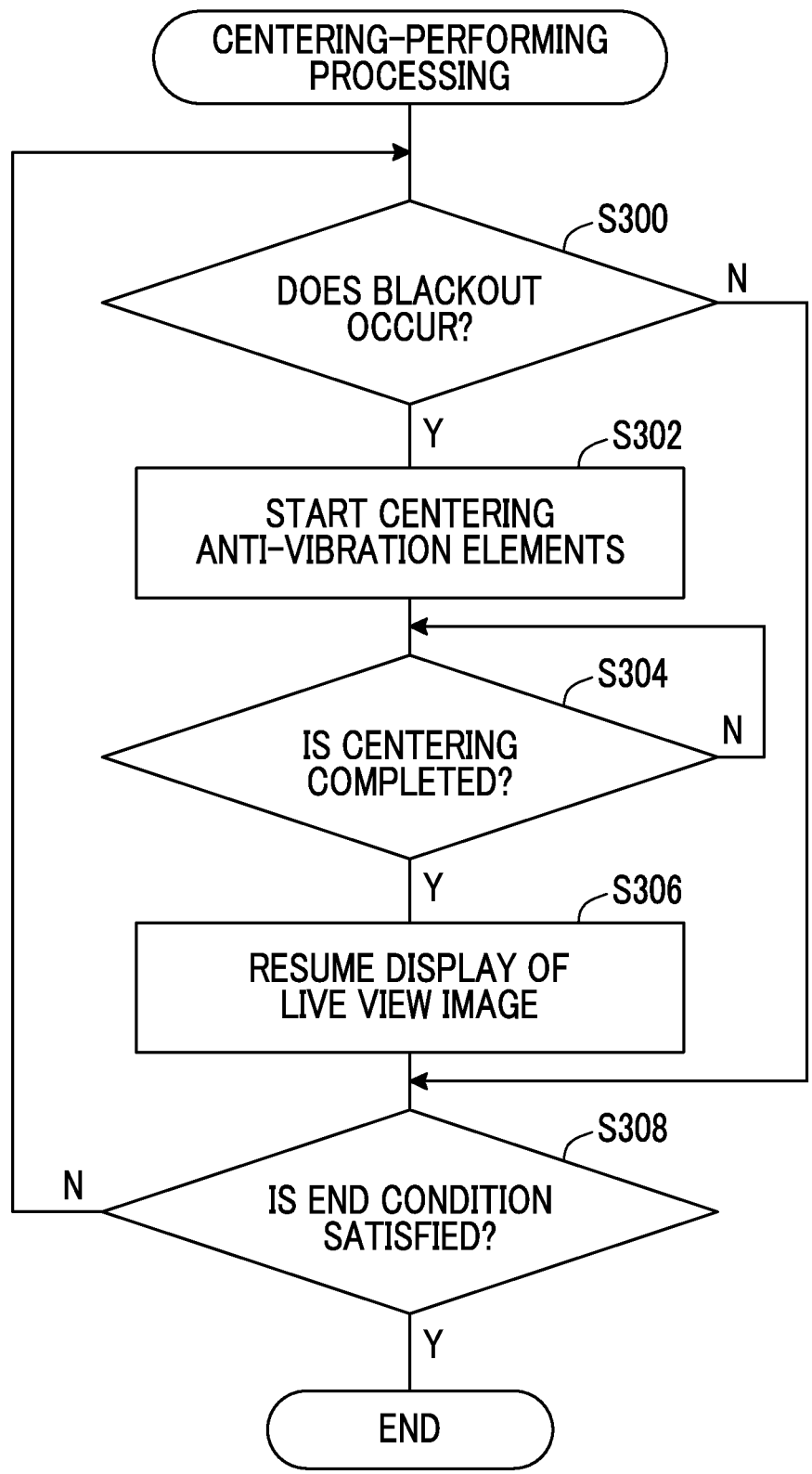
FIG. 9 is a flowchart showing an example of the flow of centering-performing processing according to the first embodiment.

In the centering-performing processing shown in FIG. 9, first, in Step 300, the CPU 74 determines whether or not a blackout occurs in displaying a live view image. In a case where a blackout does not occur in displaying a live view image in Step 300, the determination is negative and the processing proceeds to Step 308. In a case where a blackout occurs in displaying a live view image in Step 300, the determination is positive and the processing proceeds to Step 302.

Incidentally, a blackout is a phenomenon that is caused by the temporary stop of the operation of the imaging element 22 in a case where the video recording-start condition is satisfied and a case where the video recording-end condition is satisfied, and is displayed through the temporary darkening of the screen of the display 28.

Then, the CPU 74 performs the processing of Steps 302 and 304 by using a period where a blackout occurs.

The CPU 74 causes the OIS drive unit 98 to start centering the anti-vibration lens 94 through the CPU 108 and causes the BIS drive unit 80 to start centering the imaging element 22 in Step 302, and the processing then proceeds to Step 304.

In Step 304, first, the CPU 74 acquires lens position information from the lens position sensor 100 of the imaging lens 14 and acquires imaging element-position information from the imaging element-position sensor 82. Then, the CPU 74 determines whether or not the centering of the anti-vibration lens 94 and the imaging element 22 is completed with reference to the lens position information and the imaging element-position information.

In a case where the centering of the anti-vibration lens 94 and the imaging element 22 is not completed in Step 304, the determination is negative and the determination of Step 304 is performed again. In a case where the centering of the anti-vibration lens 94 and the imaging element 22 is completed in Step 304, the determination is positive and the processing proceeds to Step 306.

The CPU 74 controls the OIS drive unit 98 and the BIS drive unit 80 in the imaging device 10 so that the centering of the anti-vibration lens 94 and the imaging element 22 is accomplished by the resumption of the display of a live view image from the occurrence of a blackout.

The CPU 74 causes the display 28 to resume the display of a live view image based on an image obtained from imaging performed by the imaging device 10 in Step 306, and the processing then proceeds to Step 308.

In Step 308, the CPU 74 determines whether or not an end condition, which is a condition where the centering-performing processing is to end, is satisfied. A condition where the blurring influence-suppression processing ends is used as an example of the end condition according to the centering-performing processing. Further, a condition where a third predetermined time (for example, 120 sec.) has passed without the receipt of the instruction by the receiving device 62 after the centering-performing processing starts to be performed is used.

In a case where the end condition according to the centering-performing processing is not satisfied in Step 308, the determination is negative and the processing proceeds to Step 300. In a case where the end condition according to the centering-performing processing is satisfied in Step 308, the determination is positive and the centering-performing processing ends.

While a blackout occurs in a state where a live view image is being displayed and the influence-suppression processing is performed, the anti-vibration elements are centered in the imaging device 10 as described above. Therefore, according to the imaging device 10, the visual perception of a shift in the angle of view caused by the centering of the anti-vibration elements can be suppressed as compared to a case where the anti-vibration elements are centered in a state where a live view image is displayed.

Further, the anti-vibration elements are centered in the imaging device 10 in a case where the video recording-start condition is satisfied. Therefore, according to the imaging device 10, the deterioration of the quality of a recorded video image can be suppressed as compared to a case where the anti-vibration elements are not centered despite the satisfaction of the video recording-start condition.

Furthermore, the anti-vibration elements are centered in the imaging device 10 by using the period of a blackout. Therefore, according to the imaging device 10, the stop of an operation for displaying a video image for only the centering of the anti-vibration elements can be avoided.

Moreover, the anti-vibration elements are centered in the imaging device 10 by using the period of a blackout occurring in a case where the release button 26 is pressed down to the final pressed-down position. Therefore, according to the imaging device 10, the centering of the anti-vibration elements can be performed at a timing that is intended by a user in a case where the recording of a video image is to be started.

Further, in the imaging device 10, only the BIS processing is performed prior to the OIS processing during the display of a live view image (see Step 202). Therefore, according to the imaging device 10, the deterioration of image quality, which is caused by a difference between a lens-side movable range and an imaging element-side movable range, can be suppressed as compared to a case where both the OIS processing and the BIS processing are simultaneously performed during the display of a live view image.

Furthermore, the OIS processing starts to be performed in the imaging device 10 in a case where the imaging element 22 is in the imaging element-sticking state. Therefore, according to the imaging device 10, a blurring influence can be continuously suppressed even in a case where the imaging element-sticking state is generated.

Moreover, in the imaging device 10, the OIS processing is performed to be more dominant than the BIS processing in a case where the imaging element-sticking state is generated during the recording of a video image (see Steps 224 and 226). Therefore, according to the imaging device 10, a blurring influence can be continuously suppressed even in a case where the imaging element-sticking state is generated during the recording of a video image.

Further, in a case where the position of the anti-vibration lens 94 falls within the movable range corresponding to the imaging element-movable range while the OIS processing is performed to be more dominant than the BIS processing, the BIS processing is performed to be more dominant than the OIS processing in the imaging device 10 (see Steps 228 and 230). Therefore, according to the imaging device 10, the deterioration of image quality, which is caused by a change in aberration generated due to the movement of the anti-vibration lens 94, can be suppressed as compared to a case where the OIS processing is performed to be always more dominant than the BIS processing.

In the first embodiment, description has been made on the premise that a blackout is a phenomenon occurring inevitably. However, the technique of the disclosure is not limited thereto. For example, a blackout may be caused to occur intentionally. In this case, for example, the CPU 74 may cause the display 28 to perform control causing a blackout to occur with the start of the recording of a video image under a condition where a condition for centering is satisfied. Examples of the condition for centering include a condition where a fourth predetermined time (for example, 10 sec.) has passed after the imaging element-sticking state and/or an anti-vibration lens-sticking state to be described later is generated.

Furthermore, the gyro sensor 70 has been exemplified in the first embodiment, but the technique of the disclosure is not limited thereto. An acceleration sensor may be used instead of the gyro sensor 70. Moreover, the gyro sensor 70 and an acceleration sensor may be used together. As described above, any sensor may be used as long as functioning as a detection unit for detecting vibration applied to the imaging device 10.

Second Embodiment

A case where the BIS processing is performed prior to the OIS processing in the blurring influence-suppression processing has been described in the first embodiment, but a case where the OIS processing is performed prior to the BIS processing in the blurring influence-suppression processing will be described in a second embodiment. In the second embodiment, the same components as the components described in the first embodiment will be denoted by the same reference numerals as those of the first embodiment and the description thereof will be omitted.

As shown in, for example, FIGS. 1 to 4, an imaging device 10A according to the second embodiment is different from the imaging device 10 according to the first embodiment in that the imaging device 10A includes an imaging device body 12A instead of the imaging device body 12.

As shown in, for example, FIG. 3, the imaging device body 12A is different from the imaging device body 12 in that the imaging device body 12A includes a body-side main controller 46A instead of the body-side main controller 46. The body-side main controller 46A is different from the body-side main controller 46 in that the body-side main controller 46A includes a secondary storage unit 78A instead of the secondary storage unit 78.

As shown in, for example, FIG. 6, the secondary storage unit 78A is different from the secondary storage unit 78 in that the secondary storage unit 78A stores a blurring influence-suppression program 134A instead of the blurring influence-suppression program 134. The CPU 74 reads the blurring influence-suppression program 134A from the secondary storage unit 78A, develops the blurring influence-suppression program 134A in the primary storage unit 76, and performs blurring influence-suppression processing shown in FIG. 10 according to the developed blurring influence-suppression program 134A. In other words, the CPU 74 operates as a control unit according to the technique of the disclosure by executing the blurring influence-suppression program 134A.

Next, the blurring influence-suppression processing shown in FIG. 10 will be described as the actions of parts of the imaging device 10A according to the technique of the disclosure. The same processing as the processing of the flowchart of the blurring influence-suppression processing, which is described in the first embodiment and is shown in FIGS. 7 and 8, will be denoted by the same step numbers as those of the flowchart and the description thereof will be omitted.

Figure 10:
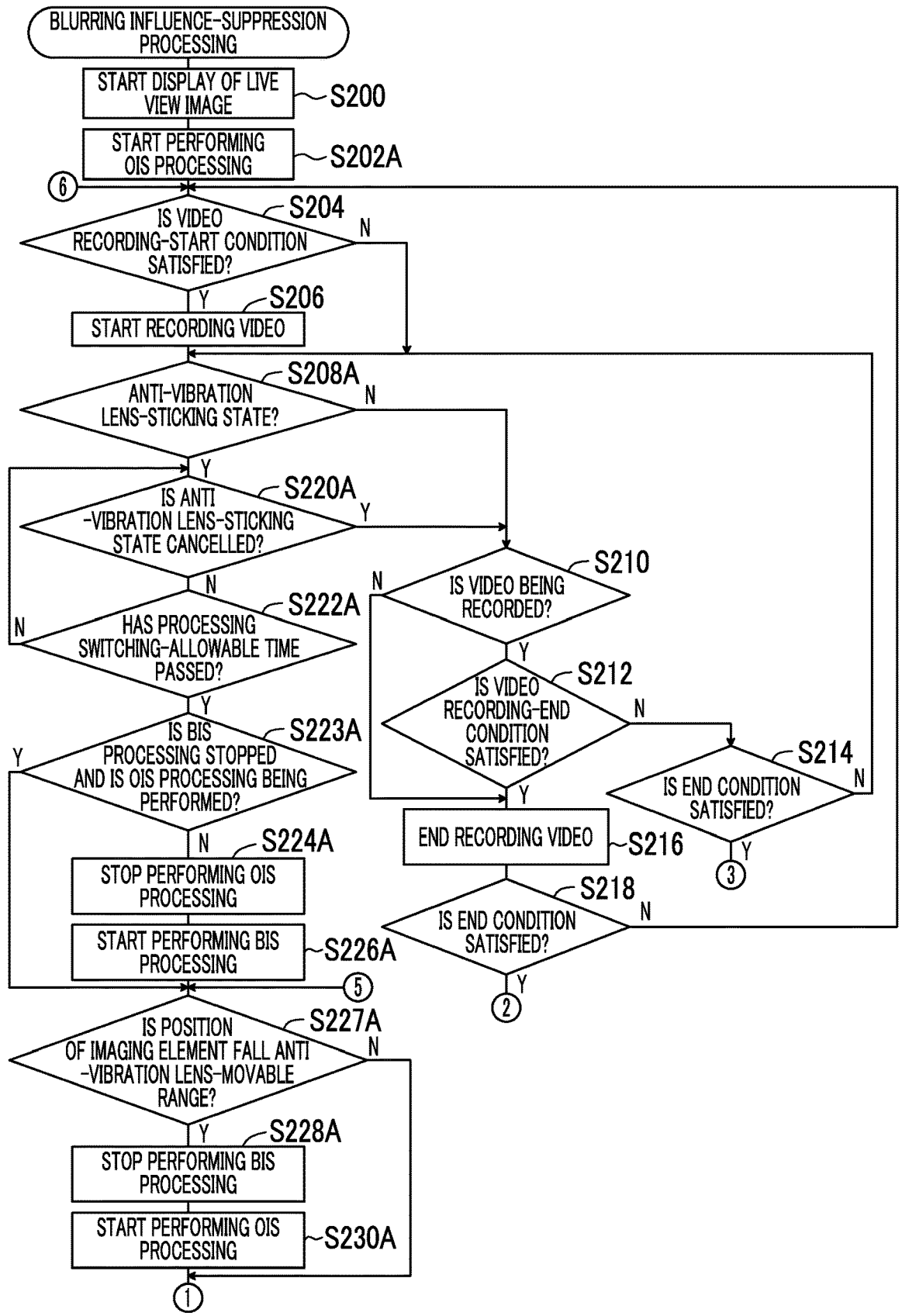
FIG. 10 is a flowchart showing an example of the flow of blurring influence-suppression processing according to the second embodiment.

The blurring influence-suppression processing shown in FIG. 10 is different from the blurring influence-suppression processing described in the first embodiment in that the blurring influence-suppression processing shown in FIG. 10 includes Step 202A instead of Step 202 and includes Step 208A instead of Step 208. Further, the blurring influence-suppression processing shown in FIG. 10 is different from the blurring influence-suppression processing described in the first embodiment in that the blurring influence-suppression processing shown in FIG. 10 includes Steps 220A to 230A instead of Steps 220 to 230.

The CPU 74 causes the OIS drive unit 98 to perform OIS processing through the CPU 108 in Step 202A shown in FIG. 10, and the processing then proceeds to Step 204.

In Step 208A shown in FIG. 10, first, the CPU 74 acquires lens position information from the lens position sensor 100 of the imaging lens 14 through the CPU 108 and acquires the lens information 130 from the secondary storage unit 112 of the imaging lens 14. Then, the CPU 74 determines whether or not the anti-vibration lens 94 is in an anti-vibration lens-sticking state with reference to the lens position information and the lens-movable range information 130A included in the lens information 130.

Here, the "anti-vibration lens-sticking state" refers to a state where the anti-vibration lens 94 reaches a limit position in the second predetermined plane. Here, "a limit position in the second predetermined plane" refers to the limit position of the anti-vibration lens-movable range that is represented by the lens-movable range information 130A. "The limit position of the anti-vibration lens-movable range" means the upper limit position and the lower limit position of the anti-vibration lens-movable range, that is, the upper limit position and the lower limit position of the maximum stroke that is allowed for the anti-vibration lens 94.

In a case where the anti-vibration lens 94 is not in the anti-vibration lens-sticking state in Step 208A, the determination is negative and the processing proceeds to Step 210. In a case where the anti-vibration lens 94 is in the anti-vibration lens-sticking state in Step 208A, the determination is positive and the processing proceeds to Step 220A.

In Step 220A, first, the CPU 74 acquires the lens position information from the lens position sensor 100 of the imaging lens 14 through the CPU 108 and acquires the lens information 130 from the secondary storage unit 112 of the imaging lens 14 through the CPU 108. Then, the CPU 74 determines whether or not the anti-vibration lens-sticking state is cancelled with reference to the lens position information and the lens-movable range information 130A included in the lens information 130. "The anti-vibration lens-sticking state is cancelled" refers to a state where the anti-vibration lens 94 is present at a position other than the limit position in the anti-vibration lens-movable range.

In a case where the anti-vibration lens-sticking state is cancelled in Step 220A, the determination is positive and the processing proceeds to Step 210. In a case where the anti-vibration lens-sticking state is not cancelled in Step 220A, the determination is negative and the processing proceeds to Step 222A.

In Step 222A, the CPU 74 determines whether or not a processing switching-allowable time according to the second embodiment has passed without the cancellation of the anti-vibration lens-sticking state after the determination of Step 208A becomes positive. The processing switching-allowable time according to the second embodiment refers to a time (for example, 5 sec.) that is predetermined as a time when the switching of processing to the BIS processing from the OIS processing is allowed. "The switching of processing to the BIS processing from the OIS processing" means that the OIS processing is stopped and the BIS processing starts to be performed.

In a case where the processing switching-allowable time according to the second embodiment has not passed without the cancellation of the anti-vibration lens-sticking state after the determination of Step 208A becomes positive in Step 222A, the determination is negative and the processing proceeds to Step 220A. In a case where the processing switching-allowable time has passed without the cancellation of the anti-vibration lens-sticking state after the determination of Step 208A becomes positive in Step 222A, the determination is positive and the processing proceeds to Step 223A.

In Step 223A, the CPU 74 determines whether or not the OIS processing is stopped and the BIS processing is being performed.

In the blurring influence-suppression processing according to the second embodiment, the BIS processing or the OIS processing is performed until the end condition according to the blurring influence-suppression processing of the second embodiment is satisfied after the processing of Step 202A is performed. Accordingly, a case where the determination is negative in Step 223A means a case where the OIS processing is being performed and the BIS processing is stopped.

In a case where the OIS processing is stopped and the BIS processing is being performed in Step 223A, the determination is positive and the processing proceeds to Step 227A. In a case where the OIS processing is being performed and the BIS processing is stopped in Step 223A, the determination is negative and the processing proceeds to Step 224A.

The CPU 74 causes the OIS drive unit 98 to stop performing the OIS processing through the CPU 108 in Step 224A, and the processing then proceeds to Step 226A.

The CPU 74 causes the BIS drive unit 80 to start performing the BIS processing in Step 226A, and the processing then proceeds to Step 227A.

Since the processing of Steps 224A and 226A is performed in this way, the BIS processing is performed to be more dominant than the OIS processing.

In Step 227A, first, the CPU 74 acquires imaging element-position information from the imaging element-position sensor 82 and acquires the lens information 130 from the secondary storage unit 112 of the imaging lens 14 through the CPU 108. Then, the CPU 74 determines whether or not the position of the imaging element 22 falls within a movable range corresponding to the anti-vibration lens-movable range with reference to the imaging element-position information and the lens-movable range information 130A included in the lens information 130.

"A movable range corresponding to the anti-vibration lens-movable range" means a movable range corresponding to the anti-vibration lens-movable range in the first predetermined plane. In other words, "a movable range corresponding to the anti-vibration lens-movable range" means a stroke that is required for the movement of the imaging element 22 in the first predetermined plane and is the same as the maximum stroke allowed for the anti-vibration lens 94.

In a case where the position of the imaging element 22 does not fall within the anti-vibration lens-movable range in Step 227A, the determination is negative and the processing proceeds to Step 244 shown in FIG. 8. In a case where the position of the imaging element 22 falls within the anti-vibration lens-movable range in Step 227A, the determination is positive and the processing proceeds to Step 228A.

The CPU 74 causes the BIS drive unit 80 to stop performing the BIS processing in Step 228A, and the processing then proceeds to Step 230A.

The CPU 74 causes the OIS drive unit 98 to start performing the OIS processing through the CPU 108 in Step 230A, and the processing then proceeds to Step 244 shown in FIG. 8.

As described above, in the imaging device 10A, only the OIS processing is performed prior to the BIS processing during the display of a live view image (see Step 202A). Therefore, according to the imaging device 10A, the deterioration of image quality, which is caused by a difference between a lens-side movable range and an imaging element-side movable range, can be suppressed as compared to a case where both the OIS processing and the BIS processing are simultaneously performed during the display of a live view image.

Further, the BIS processing starts to be performed in the imaging device 10A in a case where the anti-vibration lens 94 is in the anti-vibration lens-sticking state. Therefore, according to the imaging device 10A, a blurring influence can be continuously suppressed even in a case where the anti-vibration lens 94 is in the anti-vibration lens-sticking state.

Furthermore, in the imaging device 10A, the BIS processing is performed to be more dominant than the OIS processing in a case where the anti-vibration lens-sticking state is generated during the recording of a video image (see Steps 224A and 226A). Therefore, according to the imaging device 10A, a blurring influence can be continuously suppressed even in a case where the anti-vibration lens-sticking state is generated during the recording of a video image.

Moreover, in a case where the position of the anti-vibration lens 94 falls within the movable range corresponding to the imaging element-movable range while the BIS processing is performed to be more dominant than the OIS processing, the OIS processing is performed to be more dominant than the BIS processing in the imaging device 10A (see Steps 228A and 230A). Therefore, according to the imaging device 10A, a load applied to the BIS processing can be reduced as compared to a case where the BIS processing is performed to be always more dominant than the OIS processing.

Third Embodiment

A case where centering is performed in a case where a blackout occurs has been described in each embodiment, but a case where centering is performed using the period of a blackout occurring in a case where a video recording-start condition is satisfied will be described in a third embodiment. In the third embodiment, the same components as the components described in the first embodiment will be denoted by the same reference numerals as those of the first embodiment and the description thereof will be omitted.

As shown in, for example, FIGS. 1 to 4, an imaging device 10B according to the third embodiment is different from the imaging device 10 according to the first embodiment in that the imaging device 10B includes an imaging device body 12B instead of the imaging device body 12.

As shown in, for example, FIG. 3, the imaging device body 12B is different from the imaging device body 12 in that the imaging device body 12B includes a body-side main controller 46B instead of the body-side main controller 46. The body-side main controller 46B is different from the body-side main controller 46 in that the body-side main controller 46B includes a secondary storage unit 78B instead of the secondary storage unit 78.

As shown in, for example, FIG. 6, the secondary storage unit 78B is different from the secondary storage unit 78 in that the secondary storage unit 78B stores a centering-performing program 136A instead of the centering-performing program 136. The CPU 74 reads the centering-performing program 136A from the secondary storage unit 78B, develops the centering-performing program 136A in the primary storage unit 76, and performs centering-performing processing shown in FIG. 11 according to the developed centering-performing program 136A. In other words, the CPU 74 operates as a control unit according to the technique of the disclosure by executing the centering-performing program 136A.

Next, the centering-performing processing shown in FIG. 11 will be described as the actions of parts of the imaging device 10B according to the technique of the disclosure. The same processing as the processing of the flowchart of the centering-performing processing, which is described in the first embodiment and is shown in FIG. 9, will be denoted by the same step numbers as those of the flowchart and the description thereof will be omitted.

Figure 11:
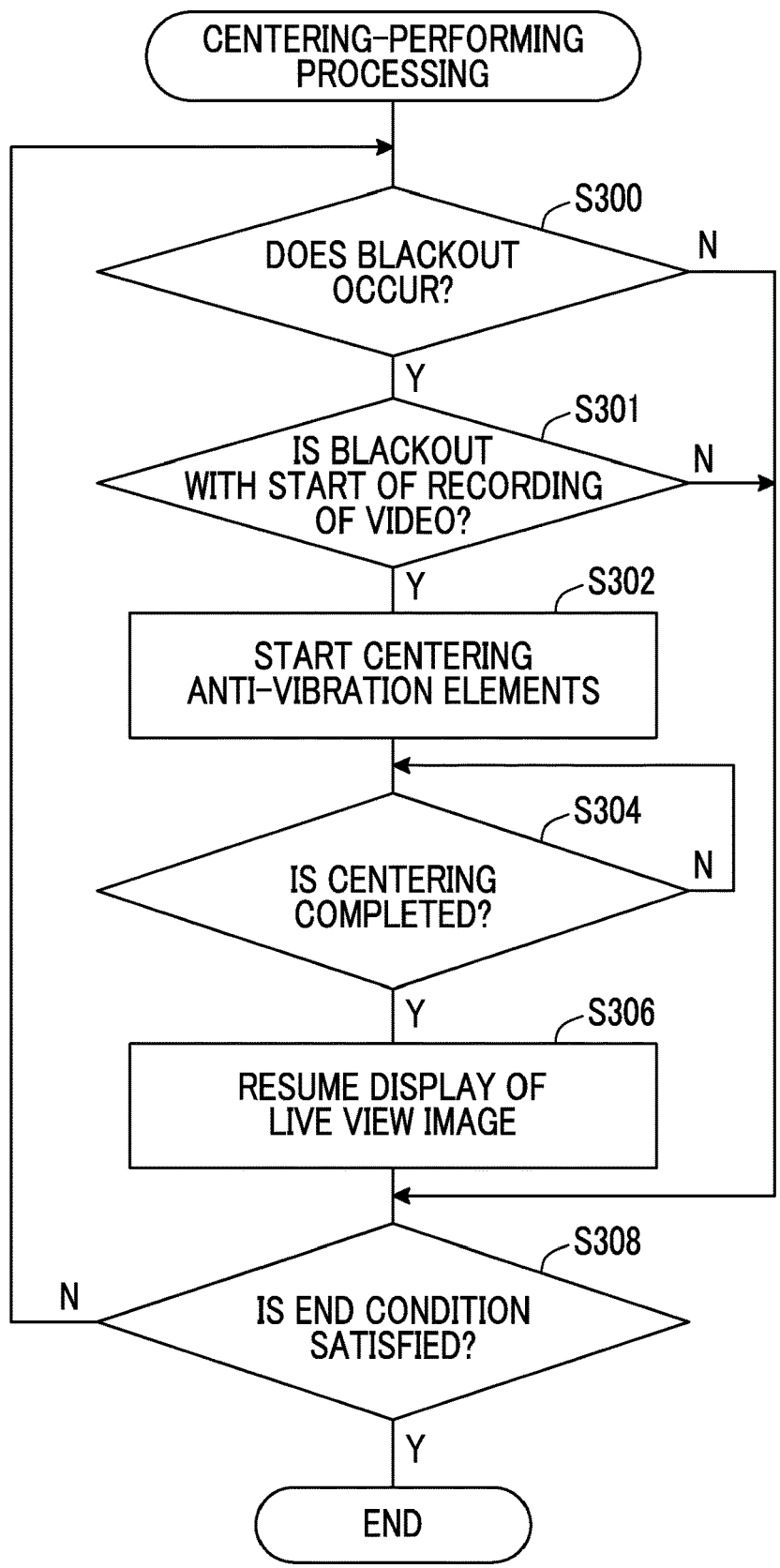
FIG. 11 is a flowchart showing an example of the flow of centering-performing processing according to the third embodiment.

The centering-performing processing shown in FIG. 11 is different from the centering-performing processing shown in FIG. 9 in that the centering-performing processing shown in FIG. 11 includes Step 301 between Step 300 and Step 302.

In the centering-performing processing shown in FIG. 11, in Step 301, the CPU 74 determines whether or not an occurring blackout is a blackout occurring with the start of the recording of a video image. In a case where an occurring blackout is not a blackout occurring with the start of the recording of a video image in Step 301, the processing proceeds to Step 308. In a case where an occurring blackout is a blackout occurring with the start of the recording of a video image in Step 301, the processing proceeds to Step 302.

The blackout occurring with the start of the recording of a video image refers to a blackout that occurs in a case where the release button 26 is pressed down to the final presseddown position in a state where a video image is not recorded under the video imaging mode.

As described above, the centering of the anti-vibration elements is performed in the imaging device 10B by using the period of a blackout that occurs with the start of the recording of a video image. Therefore, according to the imaging device 10B, the visual perception of a shift in the angle of view caused by the centering of the anti-vibration elements can be suppressed at the time of start of the recording of a video image.

Fourth Embodiment

A case where centering is performed in a case where a blackout occurs has been described in each embodiment, but a case where centering is performed using the period of a freeze will be described in a fourth embodiment. In the fourth embodiment, the same components as the components described in the first embodiment will be denoted by the same reference numerals as those of the first embodiment and the description thereof will be omitted.

As shown in, for example, FIGS. 1 to 4, an imaging device 10C according to the fourth embodiment is different from the imaging device 10 according to the first embodiment in that the imaging device 10C includes an imaging device body 12C instead of the imaging device body 12.

As shown in, for example, FIG. 3, the imaging device body 12C is different from the imaging device body 12 in that the imaging device body 12C includes a body-side main controller 46C instead of the body-side main controller 46. The body-side main controller 46C is different from the body-side main controller 46 in that the body-side main controller 46C includes a secondary storage unit 78C instead of the secondary storage unit 78.

As shown in, for example, FIG. 6, the secondary storage unit 78C is different from the secondary storage unit 78 in that the secondary storage unit 78C stores a centering-performing program 136B instead of the centering-performing program 136. The CPU 74 reads the centering-performing program 136B from the secondary storage unit 78C, develops the centering-performing program 136B in the primary storage unit 76, and performs centering-performing processing shown in FIG. 12 according to the developed centering-performing program 136B. In other words, the CPU 74 operates as a control unit according to the technique of the disclosure by executing the centering-performing program 136B.

Next, the centering-performing processing shown in FIG. 12 will be described as the actions of parts of the imaging device 10C according to the technique of the disclosure. The same processing as the processing of the flowchart of the centering-performing processing, which is described in the first embodiment and is shown in FIG. 9, will be denoted by the same step numbers as those of the flowchart and the description thereof will be omitted.

Figure 12:
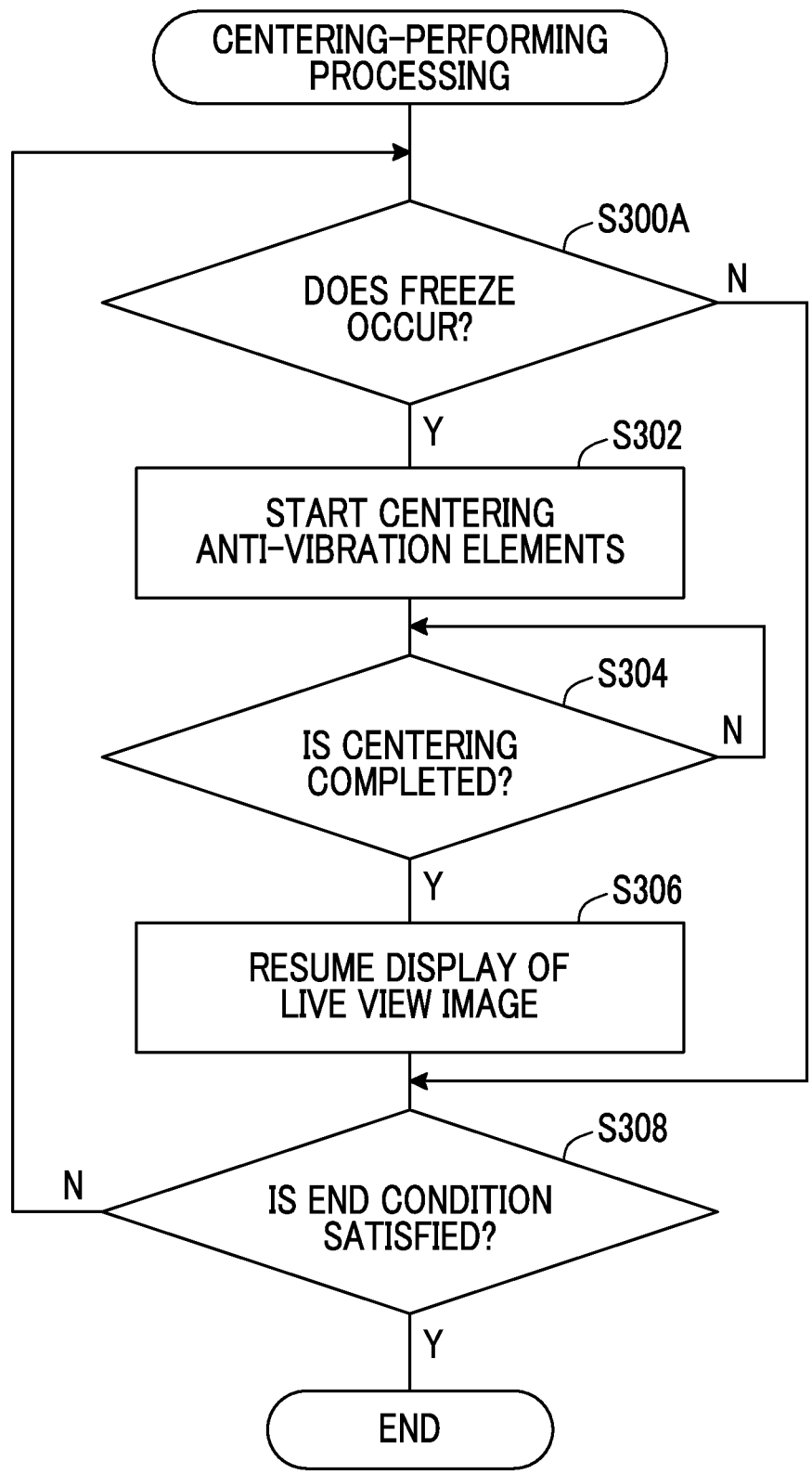
FIG. 12 is a flowchart showing an example of the flow of centering-performing processing according to the fourth embodiment.

The centering-performing processing shown in FIG. 12 is different from the centering-performing processing shown in FIG. 9 in that the centering-performing processing shown in FIG. 12 includes Step 300A instead of Step 300.

In the centering-performing processing shown in FIG. 12, in Step 300A, the CPU 74 determines whether or not a freeze occurs in displaying a live view image. A freeze refers to a phenomenon where a live view image is temporarily stopped. Further, a freeze is a phenomenon that inevitably occurs during the display of a live view image as with a blackout described in the first embodiment.

In a case where a freeze occurs in displaying a live view image in Step 300A, the determination is positive and the processing proceeds to Step 302. In a case where a freeze does not occur in displaying a live view image in Step 300A, the determination is negative and the processing proceeds to Step 308.

As described above, the centering of the anti-vibration elements is performed in the imaging device 10C by using the period of a freeze. Therefore, according to the imaging device 10C, the stop of an operation for displaying a video image for only the centering of the anti-vibration elements can be avoided.

In the fourth embodiment, description has been made on the premise that a freeze is a phenomenon occurring inevitably. However, the technique of the disclosure is not limited thereto. For example, the CPU 74 may cause a freeze to intentionally occur by causing the display 28 to display images corresponding to one or more frames in a static state, and the anti-vibration elements may be centered in a period where a freeze occurs. Accordingly, the visual perception of a shift in the angle of view caused by the centering of the anti-vibration lens 94 can be suppressed as compared to a case where the anti-vibration elements are centered in a state where a live view image is displayed at a specific frame rate.

Further, in a case where a freeze is caused to intentionally occur as described above, for example, the CPU 74 may cause the display 28 to perform control causing a freeze to occur with the start of the recording of a video image under a condition where a condition for centering is satisfied. Examples of the condition for centering include a condition where a fifth predetermined time (for example, 10 sec.) has passed after the imaging element-sticking state and/or the anti-vibration lens-sticking state is generated.

Fifth Embodiment

A case where centering is performed in a case where a blackout occurs has been described in the first embodiment, but a case where centering is performed using the period of a blackout or a freeze will be described in a fifth embodiment. In the fifth embodiment, the same components as the components described in the first embodiment will be denoted by the same reference numerals as those of the first embodiment and the description thereof will be omitted.

As shown in, for example, FIGS. 1 to 4, an imaging device 10D according to the fifth embodiment is different from the imaging device 10 according to the first embodiment in that the imaging device 10D includes an imaging device body 12D instead of the imaging device body 12.

As shown in, for example, FIG. 3, the imaging device body 12D is different from the imaging device body 12 in that the imaging device body 12D includes a body-side main controller 46D instead of the body-side main controller 46. The body-side main controller 46D is different from the body-side main controller 46 in that the body-side main controller 46D includes a secondary storage unit 78D instead of the secondary storage unit 78.

As shown in, for example, FIG. 6, the secondary storage unit 78D is different from the secondary storage unit 78 in that the secondary storage unit 78D stores a centering-performing program 136C instead of the centering-performing program 136. The CPU 74 reads the centering-performing program 136C from the secondary storage unit 78D, develops the centering-performing program 136C in the primary storage unit 76, and performs centering-performing processing shown in FIG. 13 according to the developed centering-performing program 136C. In other words, the CPU 74 operates as a control unit according to the technique of the disclosure by executing the centering-performing program 136C.

Next, the centering-performing processing shown in FIG. 13 will be described as the actions of parts of the imaging device 10D according to the technique of the disclosure. The same processing as the processing of the flowchart of the centering-performing processing, which is described in the first embodiment and is shown in FIG. 9, will be denoted by the same step numbers as those of the flowchart and the description thereof will be omitted.

Figure 13:
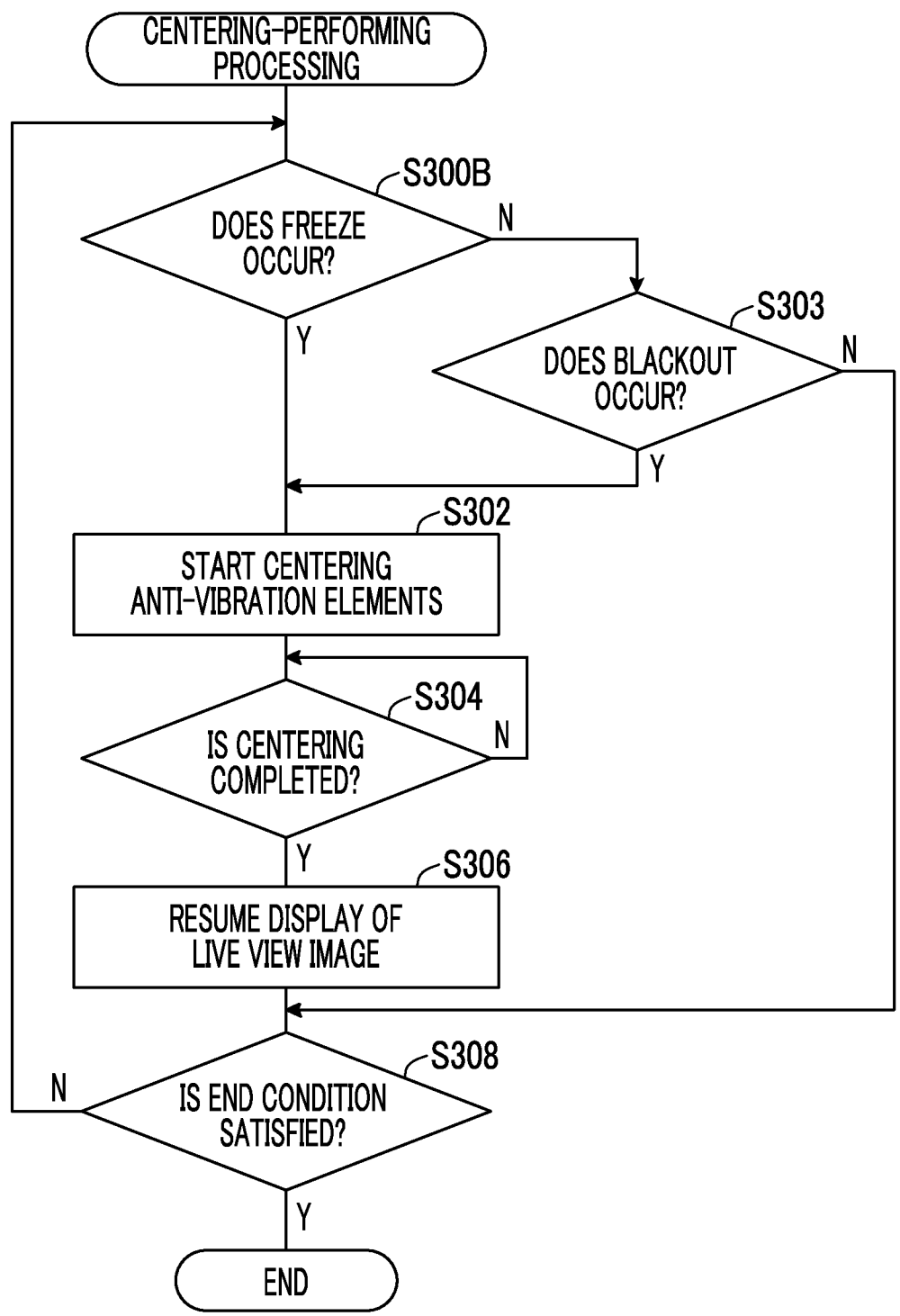
FIG. 13 is a flowchart showing an example of the flow of centering-performing processing according to the fifth embodiment.

The centering-performing processing shown in FIG. 13 is different from the centering-performing processing shown in FIG. 9 in that the centering-performing processing shown in FIG. 13 includes Step 300B instead of Step 300. Further, the centering-performing processing shown in FIG. 13 is different from the centering-performing processing shown in FIG. 9 in that the centering-performing processing shown in FIG. 13 includes Step 303.

In the centering-performing processing shown in FIG. 13, in Step 300B, the CPU 74 determines whether or not a freeze occurs in displaying a live view image. In a case where a freeze occurs in displaying a live view image in Step 300B, the determination is positive and the processing proceeds to Step 302. In a case where a freeze does not occur in displaying a live view image in Step 300B, the determination is negative and the processing proceeds to Step 303.

In Step 303, the CPU 74 determines whether or not a blackout occurs in displaying a live view image. In a case where a blackout occurs in displaying a live view image in Step 303, the determination is positive and the processing proceeds to Step 302. In a case where a blackout does not occur in displaying a live view image in Step 303, the determination is negative and the processing proceeds to Step 308.

As described above, the centering of the anti-vibration elements is performed in the imaging device 10D by using the period of a freeze or a blackout. Therefore, according to the imaging device 10D, the stop of an operation for displaying a video image for only the centering of the anti-vibration elements can be avoided.

In the fifth embodiment, description has been made on the premise that a blackout and a freeze are phenomena occurring inevitably. However, the technique of the disclosure is not limited thereto. For example, a blackout and/or a freeze may be caused to intentionally occur. In this case, for example, the CPU 74 may cause the display 28 to perform control causing a blackout and/or a freeze to occur with the start of the recording of a video image under a condition where a condition for centering is satisfied. Examples of the condition for centering include a condition where a sixth predetermined time (for example, 10 sec.) has passed after the imaging element-sticking state and/or the anti-vibration lens-sticking state is generated.

Sixth Embodiment

A case where centering is performed in a case where a blackout occurs has been described in the first embodiment, but a case where centering is performed using a blackout, a freeze, or a movement vector will be described in a sixth embodiment. In the sixth embodiment, the same components as the components described in the first embodiment will be denoted by the same reference numerals as those of the first embodiment and the description thereof will be omitted.

As shown in, for example, FIGS. 1 to 4, an imaging device 10E according to the sixth embodiment is different from the imaging device 10 according to the first embodiment in that the imaging device 10E includes an imaging device body 12E instead of the imaging device body 12.

As shown in, for example, FIG. 3, the imaging device body 12E is different from the imaging device body 12 in that the imaging device body 12E includes a body-side main controller 46E instead of the body-side main controller 46. The body-side main controller 46E is different from the body-side main controller 46 in that the body-side main controller 46E includes a secondary storage unit 78E instead of the secondary storage unit 78.

As shown in, for example, FIG. 6, the secondary storage unit 78E is different from the secondary storage unit 78 in that the secondary storage unit 78E stores a centering-performing program 136D instead of the centering-performing program 136. The CPU 74 reads the centering-performing program 136D from the secondary storage unit 78E, develops the centering-performing program 136D in the primary storage unit 76, and performs centering-performing processing shown in FIG. 14 according to the developed centering-performing program 136D. In other words, the CPU 74 operates as a control unit according to the technique of the disclosure by executing the centering-performing program 136D.

Next, the centering-performing processing shown in FIG. 14 will be described as the actions of parts of the imaging device 10E according to the technique of the disclosure. The same processing as the processing of the flowchart of the centering-performing processing, which is described in the first embodiment and is shown in FIG. 9, will be denoted by the same step numbers as those of the flowchart and the description thereof will be omitted.

Figure 14:
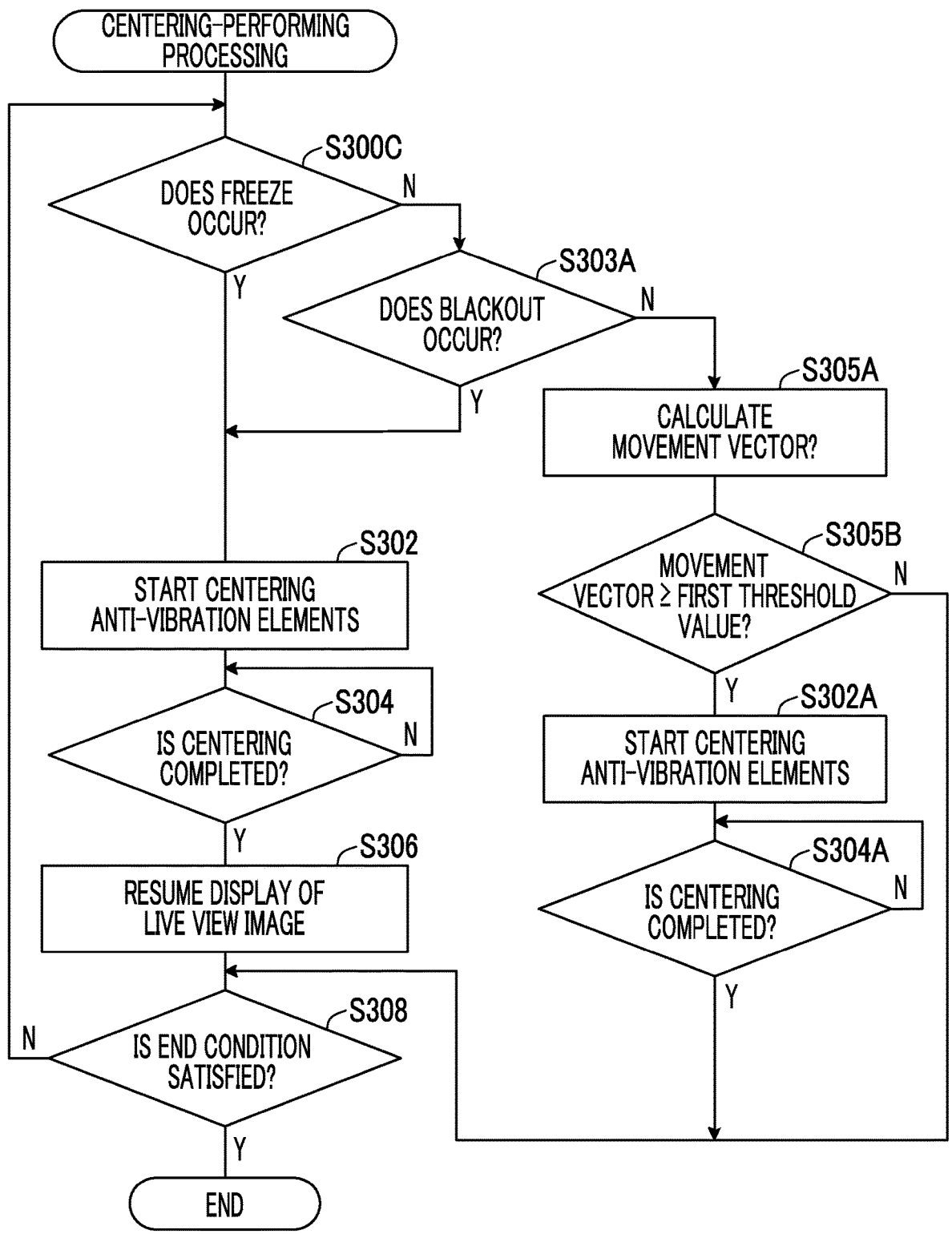
FIG. 14 is a flowchart showing an example of the flow of centering-performing processing according to the sixth embodiment.

The centering-performing processing shown in FIG. 14 is different from the centering-performing processing shown in FIG. 9 in that the centering-performing processing shown in FIG. 14 includes Step 300C instead of Step 300. Further, the centering-performing processing shown in FIG. 14 is different from the centering-performing processing shown in FIG. 9 in that the centering-performing processing shown in FIG. 14 includes Steps 303A, 305A, 305B, 302A, and 304A.

In the centering-performing processing shown in FIG. 14, in Step 300C, the CPU 74 determines whether or not a freeze occurs in displaying a live view image. In a case where a freeze occurs in displaying a live view image in Step 300C, the determination is positive and the processing proceeds to Step 302. In a case where a freeze does not occur in displaying a live view image in Step 300C, the determination is negative and the processing proceeds to Step 303A.

In Step 303A, the CPU 74 determines whether or not a blackout occurs in displaying a live view image. In a case where a blackout occurs in displaying a live view image in Step 303A, the determination is positive and the processing proceeds to Step 302. In a case where a blackout does not occur in displaying a live view image in Step 303A, the determination is negative and the processing proceeds to Step 305A.

The CPU 74 calculates a movement vector in Step 305A, and the processing then proceeds to Step 305B. The "movement vector" refers to a movement vector for the entire screen of the display 28 about, for example, a continuous frame image (for example, an image corresponding to five frames) that is obtained from imaging and is not displayed on the display 28 as a live view image.

In Step 305B, the CPU 74 determines whether or not the absolute value of the magnitude of the movement vector calculated in Step 305A is equal to or larger than a first threshold value. It is possible to estimate whether or not a main subject is determined through the determination of whether or not the absolute value of the magnitude of the movement vector is equal to or larger than the first threshold value.

Examples of the first threshold value include the absolute value of a lower limit that is determined in advance as the lower limit of the magnitude of a movement vector in which it is difficult for an image representing a main subject to be visually recognized during the display of a live view image that is obtained from imaging during panning or tilting. In the sixth embodiment, the first threshold value is a fixed value that is derived in advance on the basis of the results of a sensory test and/or a computer simulation or the like. However, the technique of the disclosure is not limited thereto. For example, the first threshold value may be a variable value that can be changed according to an instruction received by the receiving device 62.

In a case where the absolute value of the magnitude of the movement vector calculated in Step 305A is equal to or larger than the first threshold value in Step 305B, the determination is positive and the processing proceeds to Step 302A. In a case where the absolute value of the magnitude of the movement vector calculated in Step 305A is smaller than the first threshold value in Step 305B, the determination is negative and the processing proceeds to Step 308.

The CPU 74 causes the OIS drive unit 98 to start centering the anti-vibration lens 94 through the CPU 108 and causes the BIS drive unit 80 to start centering the imaging element 22 in Step 302A, and the processing then proceeds to Step 304A.

In Step 304A, first, the CPU 74 acquires lens position information from the lens position sensor 100 of the imaging lens 14 and acquires imaging element-position information from the imaging element-position sensor 82. Then, the CPU 74 determines whether or not the centering of the anti-vibration lens 94 and the imaging element 22 is completed with reference to the lens position information and the imaging element-position information.

In a case where the centering of the anti-vibration lens 94 and the imaging element 22 is not completed in Step 304A, the determination is negative and the determination of Step 304A is performed again. In a case where the centering of the anti-vibration lens 94 and the imaging element 22 is completed in Step 304A, the determination is positive and the processing proceeds to Step 308.

The CPU 74 controls the OIS drive unit 98 and the BIS drive unit 80 in the imaging device 10E so that the centering of the anti-vibration lens 94 and the imaging element 22 is accomplished during the display of a live view image of which the absolute value of the magnitude of the movement vector is equal to or larger than the first threshold value.

As described above, centering is performed in the imaging device 10E in a case where the absolute value of the magnitude of the movement vector for the entire screen is equal to or larger than the first threshold value. Therefore, according to the imaging device 10E, the stop of an operation for displaying a video image for only the centering of the anti-vibration elements can be avoided. Further, according to the imaging device 10E, the visual perception of a shift in the angle of view caused by the centering of the anti-vibration elements can be suppressed as compared to a case where the absolute value of the magnitude of the movement vector is smaller than the first threshold value.

Seventh Embodiment

A case where centering is performed using the movement vector has been described in the sixth embodiment, but a case where centering is performed using the amount of change in luminance will be described in a seventh embodiment. In the seventh embodiment, the same components as the components described in the first embodiment will be denoted by the same reference numerals as those of the first embodiment and the description thereof will be omitted.

As shown in, for example, FIGS. 1 to 4, an imaging device 10F according to the seventh embodiment is different from the imaging device 10 according to the first embodiment in that the imaging device 10F includes an imaging device body 12F instead of the imaging device body 12.

As shown in, for example, FIG. 3, the imaging device body 12F is different from the imaging device body 12 in that the imaging device body 12F includes a body-side main controller 46F instead of the body-side main controller 46. The body-side main controller 46F is different from the body-side main controller 46 in that the body-side main controller 46F includes a secondary storage unit 78F instead of the secondary storage unit 78.

As shown in, for example, FIG. 6, the secondary storage unit 78F is different from the secondary storage unit 78 in that the secondary storage unit 78F stores a centering-performing program 136E instead of the centering-performing program 136. The CPU 74 reads the centering-performing program 136E from the secondary storage unit 78F, develops the centering-performing program 136E in the primary storage unit 76, and performs centering-performing processing shown in FIG. 15 according to the developed centering-performing program 136E. In other words, the CPU 74 operates as a control unit according to the technique of the disclosure by executing the centering-performing program 136E.

Next, the centering-performing processing shown in FIG. 15 will be described as the actions of parts of the imaging device 10F according to the technique of the disclosure. The same processing as the processing of the flowchart of the centering-performing processing, which is described in the sixth embodiment and is shown in FIG. 14, will be denoted by the same step numbers as those of the flowchart and the description thereof will be omitted.

Figure 15:
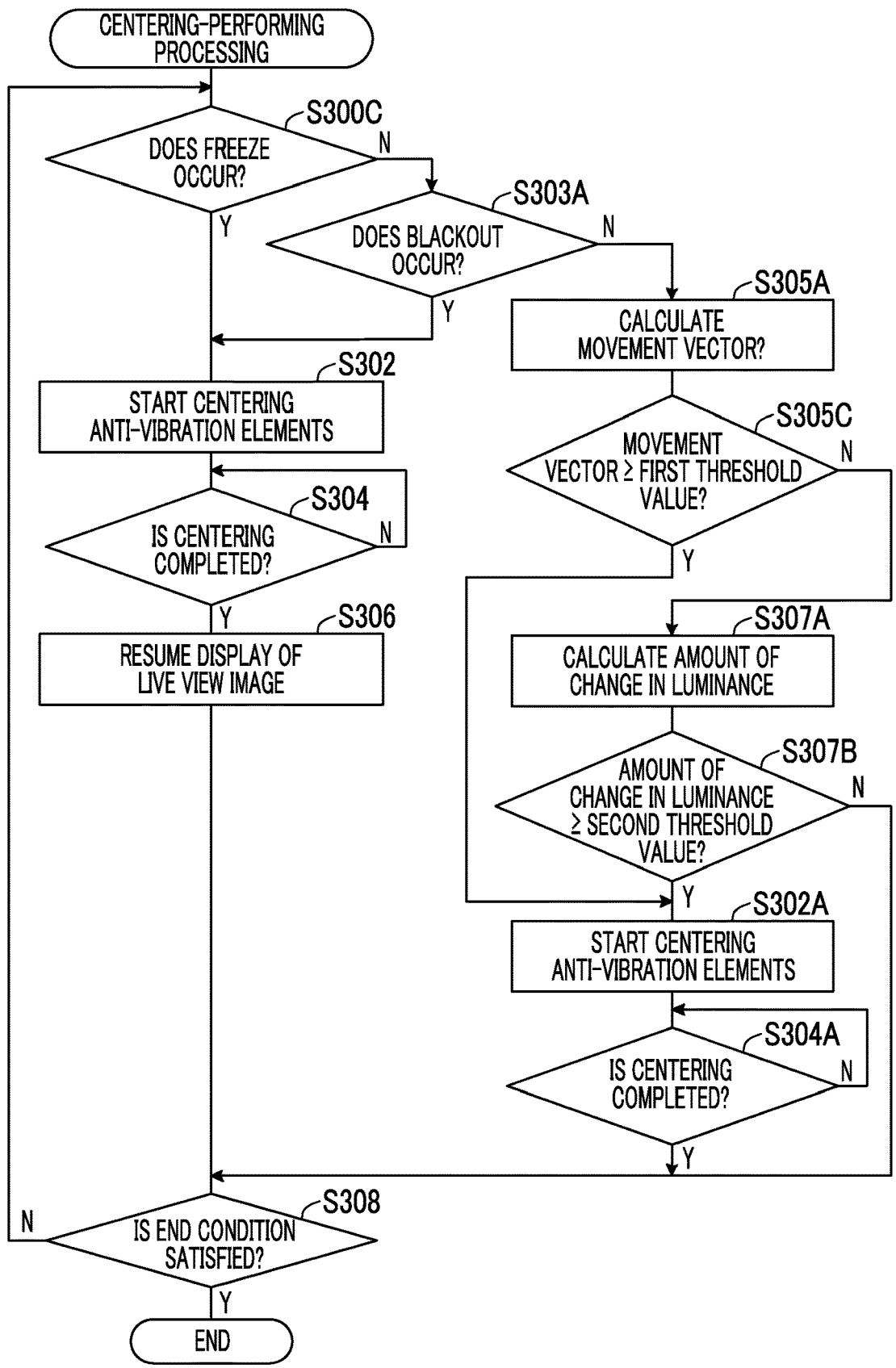
FIG. 15 is a flowchart showing an example of the flow of centering-performing processing according to the seventh embodiment.

The centering-performing processing shown in FIG. 15 is different from the centering-performing processing shown in FIG. 14 in that the centering-performing processing shown in FIG. 15 includes Step 305C instead of Step 305B. Further, the centering-performing processing shown in FIG. 15 is different from the centering-performing processing shown in FIG. 14 in that the centering-performing processing shown in FIG. 15 includes Steps 307A and 307B.

In the centering-performing processing shown in FIG. 15, in Step 305C, the CPU 74 determines whether or not the absolute value of the magnitude of the movement vector obtained in Step 305A is equal to or larger than a first threshold value. In a case where the absolute value of the magnitude of the movement vector obtained in Step 305A is equal to or larger than the first threshold value in Step 305C, the determination is positive and the processing proceeds to Step 302A. In a case where the absolute value of the magnitude of the movement vector obtained in Step 305A is smaller than the first threshold value in Step 305C, the determination is negative and the processing proceeds to Step 307A.

The CPU 74 calculates the amount of change in luminance in Step 307A, and the processing then proceeds to Step 307B. "The amount of change in luminance" refers to the amount of change in luminance for the entire screen of the display 28 about a continuous frame image (for example, an image corresponding to five frames) that is obtained from imaging and is not displayed on the display 28 as a live view image. Luminance is calculated on the basis of luminance signals that are represented by, for example, a continuous frame image.

In Step 307B, the CPU 74 determines whether or not the absolute value of the amount of change in luminance calculated in Step 307A is equal to or larger than a second threshold value (for example, 3EV (Exposure Value)). It is possible to estimate whether or not an image representing a main subject cannot be visually perceived due to, for example, a sudden change in brightness through the determination of whether or not the absolute value of the amount of change in luminance is equal to or larger than the second threshold value. A sudden change in brightness occurs due to, for example, movement to the outside from the inside, and causes so-called halations, blocked-up shadows, or the like of the screen of the display 28.

Examples of the second threshold value include the absolute value of a lower limit that is determined in advance as the lower limit of luminance where so-called halations, blocked-up shadows, or the like of the screen of the display 28 are caused. In the seventh embodiment, the second threshold value is a fixed value that is derived in advance on the basis of the results of a sensory test and/or a computer simulation or the like. However, the technique of the disclosure is not limited thereto. For example, the second threshold value may be a variable value that can be changed according to an instruction received by the receiving device 62. Further, it is determined in Step 307B whether or not the average value of the entire screen exceeds the upper limit of a predetermined output value range or is smaller than the lower limit of the predetermined output value range at, for example, the output value of an image signal (for example, 12-bit output), so that it may be determined whether or not a halation, a blocked-up shadow, or the like is generated.

In a case where the absolute value of the amount of change in luminance calculated in Step 307A is equal to or larger than the second threshold value in Step 307B, the determination is positive and the processing proceeds to Step 302A. In a case where the absolute value of the amount of change in luminance calculated in Step 307A is smaller than the second threshold value in Step 307B, the determination is negative and the processing proceeds to Step 308.

As described above, centering is performed in the imaging device 10F in a case where the absolute value of the amount of change in luminance is equal to or larger than the second threshold value. Therefore, according to the imaging device 10F, the stop of an operation for displaying a video image for only the centering of the anti-vibration elements can be avoided. Further, according to the imaging device 10F, the visual perception of a shift in the angle of view caused by the centering of the anti-vibration elements can be suppressed as compared to a case where the absolute value of the amount of change in luminance is smaller than the second threshold value.

Eighth Embodiment

Only a blackout has been exemplified in the first embodiment as a condition where the centering of the anti-vibration elements is to be performed, but a case where the end of the recording of a video image is added as a condition where the centering of the anti-vibration elements is to be performed will be described in an eighth embodiment. In the eighth embodiment, the same components as the components described in the first embodiment will be denoted by the same reference numerals as those of the first embodiment and the description thereof will be omitted.

As shown in, for example, FIGS. 1 to 4, an imaging device 10G according to the eighth embodiment is different from the imaging device 10 according to the first embodiment in that the imaging device 10G includes an imaging device body 12G instead of the imaging device body 12.

As shown in, for example, FIG. 3, the imaging device body 12G is different from the imaging device body 12 in that the imaging device body 12G includes a body-side main controller 46G instead of the body-side main controller 46. The body-side main controller 46G is different from the body-side main controller 46 in that the body-side main controller 46G includes a secondary storage unit 78G instead of the secondary storage unit 78.

As shown in, for example, FIG. 6, the secondary storage unit 78G is different from the secondary storage unit 78 in that the secondary storage unit 78G stores a blurring influence-suppression program 134B instead of the blurring influence-suppression program 134. The CPU 74 reads the blurring influence-suppression program 134B from the secondary storage unit 78G, develops the blurring influence-suppression program 134B in the primary storage unit 76, and performs blurring influence-suppression processing shown in FIGS. 16 and 17 according to the developed blurring influence-suppression program 134B. In other words, the CPU 74 operates as a control unit according to the technique of the disclosure by executing the blurring influence-suppression program 134B.

For the convenience of description, the imaging devices 10, 10A, 10B, 10C, 10D, 10E, 10F, and 10G will be referred to as "imaging devices" without being denoted by reference numerals in the following description in a case where the imaging devices 10, 10A, 10B, 10C, 10D, 10E, 10F, and 10G do not need to be described while being distinguished from each other. Further, for the convenience of description, the imaging device bodies 12, 12A, 12B, 12C, 12D, 12E, 12F, and 12G will be referred to as "imaging device bodies" without being denoted by reference numerals in the following description in a case where the imaging device bodies 12, 12A, 12B, 12C, 12D, 12E, 12F, and 12G do not need to be described while being distinguished from each other. Furthermore, for the convenience of description, the secondary storage units 78, 78A, 78B, 78C, 78D, 78E, 78F, and 78G will be referred to as "secondary storage units" without being denoted by reference numerals in the following description in a case where the secondary storage units 78, 78A, 78B, 78C, 78D, 78E, 78F, and 78G do not need to be described while being distinguished from each other. Moreover, for the convenience of description, the blurring influence-suppression programs 134, 134A, and 134B will be referred to as "blurring influence-suppression programs" without being denoted by reference numerals in the following description in a case where the blurring influence-suppression programs 134, 134A, and 134B do not need to be described while being distinguished from each other. Further, for the convenience of description, the centering-performing programs 136, 136A, 136B, 136C, 136D, and 136E will be referred to as "centering-performing programs" without being denoted by reference numerals in the following description in a case where the centering-performing programs 136, 136A, 136B, 136C, 136D, and 136E do not need to be described while being distinguished from each other. Furthermore, for the convenience of description, the blurring influence-suppression program and the centering-performing program will be simply referred to as "programs" in the following description in a case where the blurring influence-suppression program and the centering-performing program do not need to be described while being distinguished from each other.

Next, the blurring influence-suppression processing shown in FIGS. 16 and 17 will be described as the actions of parts of the imaging device 10G according to the technique of the disclosure. The same processing as the processing of the flowchart of the blurring influence-suppression processing, which is described in the first embodiment and is shown in FIGS. 7 and 8, will be denoted by the same step numbers as those of the flowchart and the description thereof will be omitted.

Figure 16:
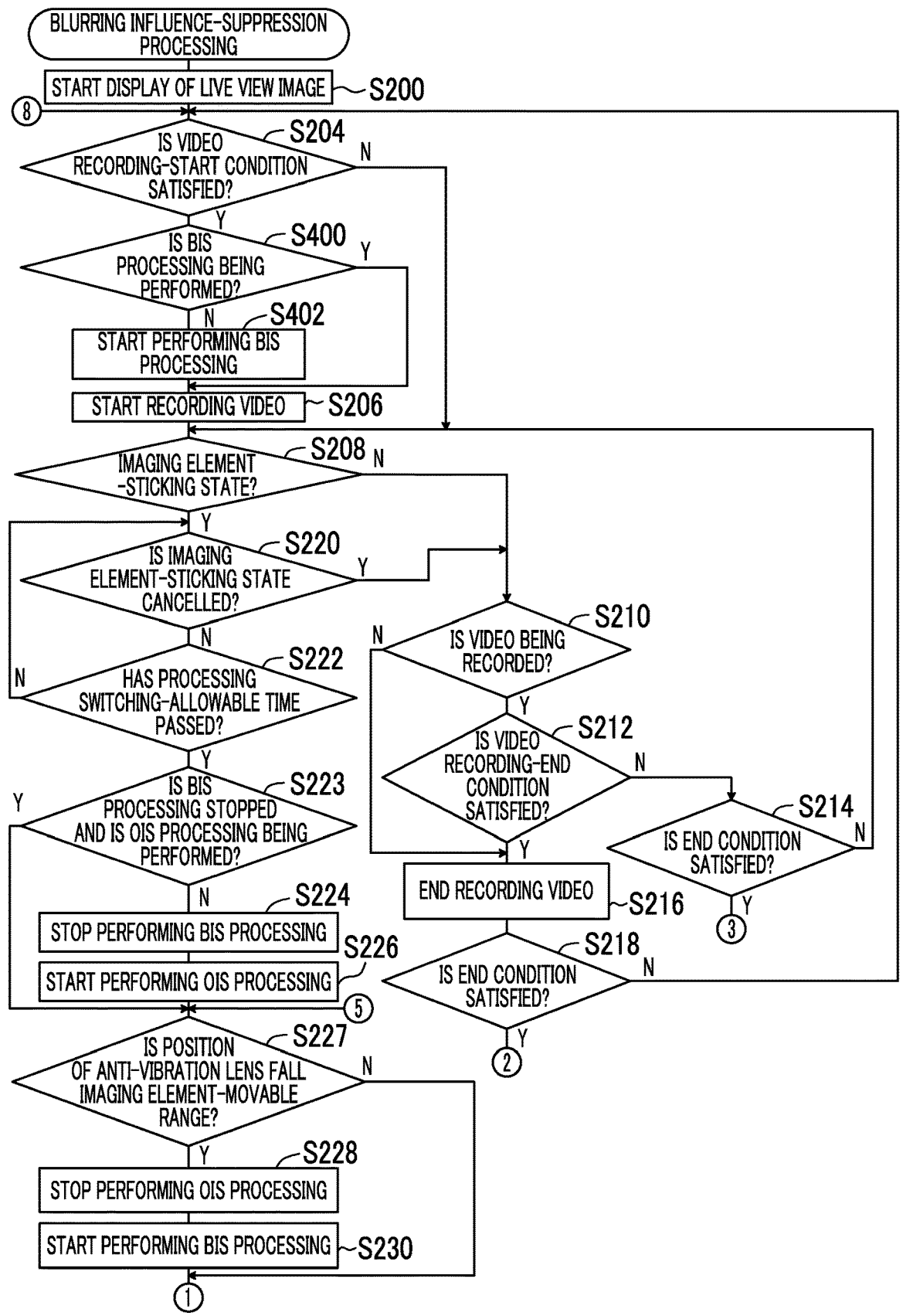
FIG. 16 is a flowchart showing an example of the flow of blurring influence-suppression processing according to the eighth embodiment.
Figure 17:
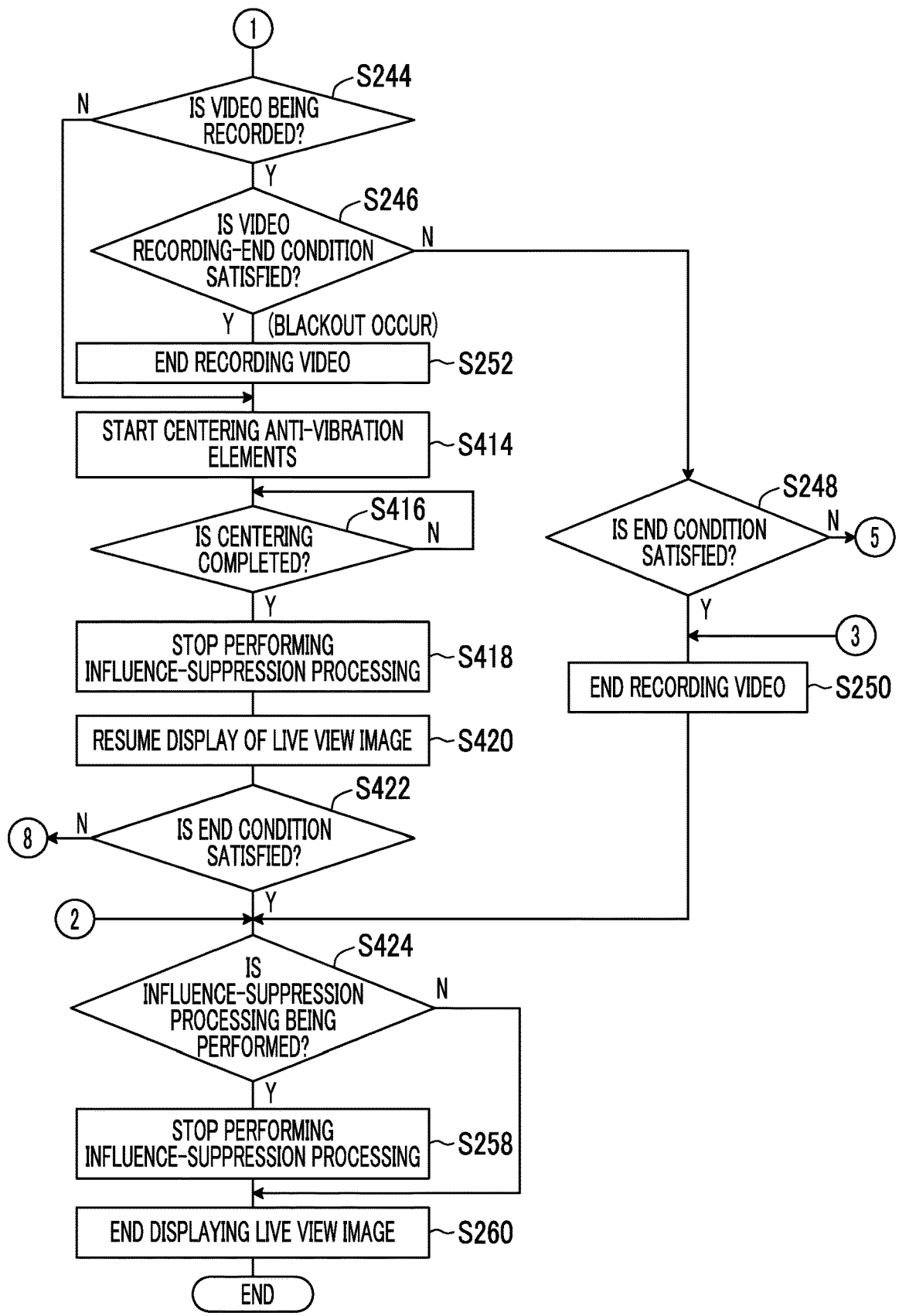
FIG. 17 is a continuation of the flowchart shown in FIG. 16.

The blurring influence-suppression processing shown in FIGS. 16 and 17 is different from the blurring influence-suppression processing described in the first embodiment in that the blurring influence-suppression processing shown in FIGS. 16 and 17 includes Steps 400 and 402 between Step 204 and Step 206. Further, the blurring influence-suppression processing shown in FIGS. 16 and 17 is different from the blurring influence-suppression processing described in the first embodiment in that the blurring influence-suppression processing shown in FIGS. 16 and 17 includes Steps 414 to 424 instead of Step 254.

In Step 400 shown in FIG. 16, the CPU 74 determines whether or not the BIS processing performed by the BIS drive unit 80 is being performed. In a case where the BIS processing performed by the BIS drive unit 80 is not being performed in Step 400, the determination is negative and the processing proceeds to Step 402. In a case where the BIS processing performed by the BIS drive unit 80 is being performed in Step 400, the determination is positive and the processing proceeds to Step 206.

The CPU 74 causes the BIS drive unit 80 to perform the BIS processing in Step 402, and the processing then proceeds to Step 206.

The CPU 74 causes the OIS drive unit 98 to start centering the anti-vibration lens 94 through the CPU 108 and causes the BIS drive unit 80 to start centering the imaging element 22 in Step 414 shown in FIG. 17, and the processing then proceeds to Step 416.

In Step 416, first, the CPU 74 acquires lens position information from the lens position sensor 100 of the imaging lens 14 and acquires imaging element-position information from the imaging element-position sensor 82. Then, the CPU 74 determines whether or not the centering of the anti-vibration lens 94 and the imaging element 22 is completed with reference to the lens position information and the imaging element-position information.

In a case where the centering of the anti-vibration lens 94 and the imaging element 22 is not completed in Step 416, the determination is negative and the determination of Step 416 is performed again. In a case where the centering of the anti-vibration lens 94 and the imaging element 22 is completed in Step 416, the determination is positive and the processing proceeds to Step 418.

The OIS drive unit 98 and the BIS drive unit 80 are controlled in the imaging device 10G so that the centering of the anti-vibration elements is accomplished by the resumption of the display of a live view image from the occurrence of a blackout with the positive determination of Step 246.

In Step 418, the CPU 74 causes the BIS drive unit 80 and the OIS drive unit 98 to stop performing the influence-suppression processing. That is, the CPU 74 causes the BIS drive unit 80 to perform the BIS processing and causes the OIS drive unit 98 to stop performing the OIS processing through the CPU 108.

The CPU 74 causes the display 28 to resume the display of a live view image based on an image obtained from imaging performed by the imaging device 10G in the next step 420, and the processing then proceeds to Step 422.

In Step 422, the CPU 74 determines whether or not an end condition according to the blurring influence-suppression processing of the eighth embodiment is satisfied. In a case where the end condition according to the blurring influence-suppression processing of the eighth embodiment is not satisfied in Step 422, the determination is negative and the processing proceeds to Step 204 shown in FIG. 16. In a case where the end condition according to the blurring influence-suppression processing of the eighth embodiment is satisfied in Step 422, the determination is positive and the processing proceeds to Step 424.

In Step 424, the CPU 74 determines whether or not the influence-suppression processing performed by the BIS drive unit 80 and the OIS drive unit 98 is being performed. In a case where the influence-suppression processing performed by the BIS drive unit 80 and the OIS drive unit 98 is being performed in Step 424, the determination is positive and the processing proceeds to Step 258. In a case where the influence-suppression processing performed by the BIS drive unit 80 and the OIS drive unit 98 is not being performed in Step 424, the determination is negative and the processing proceeds to Step 260.

As described above, the anti-vibration elements are centered in the imaging device 10G by using the period of a blackout occurring in a case where the video recording-end condition is satisfied. Further, in a case where the centering of the anti-vibration elements is completed, the influence-suppression processing is stopped and the display of a live view image is resumed. Therefore, according to the imaging device 10G, the recording of a video image can be quickly started as compared to a case where the anti-vibration elements are centered with the start of the recording of a video image.

Furthermore, the BIS processing is resumed in the imaging device 10G in a case where the video recording-start condition is satisfied in a state where the influence-suppression processing is stopped (see Step 402). Therefore, according to the imaging device 10G, both a blurring influence and the deterioration of image quality in a case where the recording of a video image is started can be suppressed as compared to a case where the influence-suppression processing is started with the start of the recording of a video in a state where the centering is not completed.

In each embodiment, a live view image has been exemplified as an example of a video image according to the technique of the disclosure. However, the technique of the disclosure is not limited thereto, and continuously taken images may be used instead of a live view image. The continuously taken images refer to a series of images that include a plurality of images obtained from the continuous imaging of a subject performed by the imaging device and are immediately and continuously displayed on the display 28 according to an operation for continuously taking images.

Further, the imaging device on which the gyro sensor 70 is mounted has been described in each embodiment, but the technique of the disclosure is not limited thereto. For example, in a case where the gyro sensor 70 is not mounted on the imaging device, an electronic device on which a gyro sensor and/or an acceleration sensor are mounted is mounted on the imaging device and the gyro sensor and/or the acceleration sensor of the electronic device may be adapted to contribute to influence-suppression processing. Examples of the electronic device on which the gyro sensor and/or the acceleration sensor are mounted include a smart device.

Figure 18:
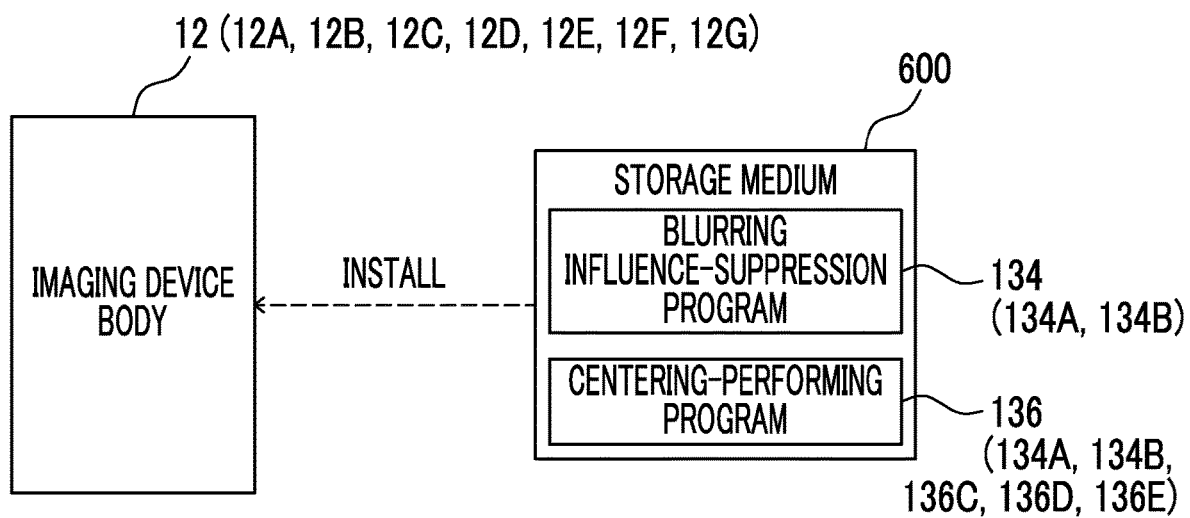
FIG. 18 is a conceptual diagram showing an example of an aspect where programs according to the first to eighth embodiments are installed on an imaging device body from a storage medium in which the programs according to the first to eighth embodiments are stored.

Furthermore, a case where the programs are read from the secondary storage unit has been exemplified in each embodiment, but the programs do not necessarily need to be stored in the secondary storage unit from the beginning. For example, as shown in FIG. 18, the programs may be stored in a storage medium 600 first. In this case, the programs of the storage medium 600 are installed on the imaging device body, and the installed programs are executed by the CPU 74. Specifically, the blurring influence-suppression program and a centering-performing program are executed by the CPU 74.

Moreover, the programs may be stored in storage units of other computers, a server device, or the like connected to the imaging device body through a communication network (not shown), and may be downloaded in response to the request of the imaging device body.

Further, the blurring influence-suppression processing and the centering-performing processing described in each embodiment are merely examples. Accordingly, it goes without saying that unnecessary steps may be deleted, new steps may be added, or the sequence of the steps may be changed without departing from the scope of the disclosure.

Furthermore, a case where the blurring influence-suppression processing and the centering-performing processing are realized by software configuration using a computer has been exemplified in each embodiment, but the technique of the disclosure is not limited thereto. For example, at least one of the blurring influence-suppression processing or the centering-performing processing may be adapted to be performed by only hardware configuration, such as FPGA or ASIC, instead of software configuration using a computer. At least one of the blurring influence-suppression processing or the centering-performing processing may be adapted to be performed by configuration where software configuration and hardware configuration are combined with each other.

All documents, patent applications, and technical standards disclosed in this specification are incorporated in this specification by reference so that the incorporation of each of the documents, the patent applications, and the technical standards by reference is specific and is as detailed as each of the documents, the patent applications, and the technical standards.

What is claimed is:

1. An imaging device, comprising:
a processor; and
a driving source that moves an anti-vibration element including at least one of an imaging element, which receives reflected light representing a subject as a subject image, or an anti-vibration lens, which is provided in an imaging lens mounted on an imaging device body including the imaging element, to a position that is determined according to a detection result of a sensor that detects vibration applied to a device, to suppress an influence of the vibration on the subject image, wherein:
the processor effects control relative to a display, which displays an image, so as to display the subject image, which is received by the imaging element, as a video image, and effects control relative to the driving source so as to center the anti-vibration element while a visibility-obstruction phenomenon, which is predetermined as a phenomenon capable of obstructing visual recognition of a shift in an angle of view accompanying centering of the anti-vibration element, occurs in a state in which an operation for displaying the video image is being performed by the display and an operation of suppressing the influence is being performed by the driving source,
the visibility-obstruction phenomenon occurs in a case in which a video recording-start condition for starting recording of the video image is satisfied, and
the visibility-obstruction phenomenon is a phenomenon stopping an operation for displaying the video image and occurring inevitably during the operation for displaying the video image.

2. An imaging device, comprising:
a processor; and
a driving source that moves an anti-vibration element including at least one of an imaging element, which receives reflected light representing a subject as a subject image, or an anti-vibration lens, which is provided in an imaging lens mounted on an imaging device body including the imaging element, to a position that is determined according to a detection result of a sensor that detects vibration applied to a device, to suppress an influence of the vibration on the subject image, wherein:
the processor effects control relative to a display, which displays an image, so as to display the subject image, which is received by the imaging element, as a video image and effects control relative to the driving source so as to center the anti-vibration element while a visibility-obstruction phenomenon, which is predetermined as a phenomenon capable of obstructing visual recognition of a shift in an angle of view accompanying centering of the anti-vibration element, occurs in a state in which an operation of displaying the video image is being performed by the display and an operation of suppressing the influence is being performed by the driving source,
the visibility-obstruction phenomenon occurs in a case in which a video recording-end condition for ending recording of the video image is satisfied, and
the processor effects control relative to the driving source so as to stop the operation of suppressing the influence by the driving source and effects control relative to the display so as to display the subject image, which is received by the imaging element, as a video image, in a case in which the centering of the anti-vibration element is complete.

3. The imaging device according to claim 2, wherein the processor effects control relative to the driving source to start the operation of suppressing the influence by the driving source in a case in which a video recording-start condition for starting recording of the video image is satisfied in a state in which the operation of suppressing the influence by the driving source is stopped.

4. The imaging device according to claim 1, wherein the visibility-obstruction phenomenon includes a blackout.

5. The imaging device according to claim 4, wherein the blackout occurs in a case in which commencement of recording of the video is instructed during the operation of displaying the video by the display.

6. The imaging device according to claim 1, wherein visibility-obstruction phenomenon includes a freeze.

7. The imaging device according to claim 6, wherein the processor effects control relative to the display so as to cause the freeze to occur by displaying, in a static state, images which correspond to one or more frames and are included in the video image, in a case in which commencement of recording of the video image is instructed in a state in which the video image is being displayed.

8. An imaging device, comprising:
a processor; and
a driving source that moves an anti-vibration element including at least one of an imaging element, which receives reflected light representing a subject as a subject image, or an anti-vibration lens, which is provided in an imaging lens mounted on an imaging device body including the imaging element, to a position that is determined according to a detection result of a sensor that detects vibration applied to a device, to suppress an influence of the vibration on the subject image, wherein:
the processor effects control relative to a display, which displays an image, so as to display the subject image, which is received by the imaging element, as a video image and effects control relative to the driving source so as to center the anti-vibration element while a visibility-obstruction phenomenon, which is predetermined as a phenomenon capable of obstructing visual recognition of a shift in an angle of view accompanying centering of the anti-vibration element, occurs in a state in which an operation of displaying the video image is being performed by the display and an operation of suppressing the influence is being performed by the driving source, and
the visibility-obstruction phenomenon includes a phenomenon such that, among images included in the video images, a plurality of images, in each of which an absolute value of magnitude of a movement vector is equal to or larger than a first threshold value, are displayed at the display.

9. An imaging device, comprising:
a processor; and
a driving source that moves an anti-vibration element including at least one of an imaging element, which receives reflected light representing a subject as a subject image, or an anti-vibration lens, which is provided in an imaging lens mounted on an imaging device body including the imaging element, to a position that is determined according to a detection result of a sensor that detects vibration applied to a device, to suppress an influence of the vibration on the subject image, wherein:
the processor effects control relative to a display, which displays an image, so as to display the subject image, which is received by the imaging element, as a video image and effects control relative to the driving source so as to center the anti-vibration element while a visibility-obstruction phenomenon, which is predetermined as a phenomenon capable of obstructing visual recognition of a shift in an angle of view accompanying centering of the anti-vibration element, occurs in a state in which an operation of displaying the video image is being performed by the display and an operation for suppressing the influence is being performed by the driving source, and
the visibility-obstruction phenomenon includes a phenomenon such that, among images included in the video image, a plurality of images, in each of which an amount of change in a physical quantity representing brightness is equal to or larger than a second threshold value, are displayed at the display.

10. An imaging device, comprising:
a processor; and
a driving source that moves an anti-vibration element including at least one of an imaging element, which receives reflected light representing a subject as a subject image, or an anti-vibration lens, which is provided in an imaging lens mounted on an imaging device body including the imaging element, to a position that is determined according to a detection result of a sensor that detects vibration applied to a device, to suppress an influence of the vibration on the subject image, wherein:
the processor effects control relative to a display, which displays an image, so as to display the subject image, which is received by the imaging element, as a video image and effects control relative to the driving source so as to center the anti-vibration element while a visibility-obstruction phenomenon, which is predetermined as a phenomenon capable of obstructing visual recognition of a shift in an angle of view accompanying centering of the anti-vibration element, occurs in a state in which an operation of displaying the video image is being performed by the display and an operation for suppressing the influence is being performed by the driving source,
the driving source is broadly divided into an imaging element-side driving source that moves the imaging element to the position determined according to the detection result so as to suppress the influence, and a lens-side driving source that moves the anti-vibration lens to the position determined according to the detection result so as to suppress the influence,
the visibility-obstruction phenomenon is predetermined as a phenomenon capable of obstructing visual recognition of a shift in an angle of view accompanying centering of the imaging element, and
the processor effects control relative to the driving source so as to perform an operation of suppressing the influence using, of the imaging element-side driving source and the lens-side driving source, only the imaging element-side driving source during the operation of displaying the video image by the display, and effects control relative to the imaging element-side driving source so as to center the imaging element while the visibility-obstruction phenomenon occurs in a state in which the operation of displaying the video image is being performed by the display and the operation of suppressing the influence is being performed by only the imaging element-side driving source.

11. The imaging device according to claim 10, wherein the processor effects control relative to the lens-side driving source so as to suppress the influence using the lens-side driving source in a case in which the imaging element reaches a limit position of a movable range of the imaging element in a state in which the operation of suppressing the influence is being performed by only the imaging element-side driving source.

12. The imaging device according to claim 11, wherein the processor effects control relative to the driving source so as to make a suppression operation of the lens-side driving source more dominant than a suppression operation of the imaging element-side driving source in a case in which the imaging element reaches the limit position of the movable range of the imaging element while recording of the video image is being performed.

13. The imaging device according to claim 12, wherein the processor effects control relative to the driving source so as to make the suppression operation of the imaging element-side driving source more dominant than the suppression operation of the lens-side driving source in a case in which a position of the anti-vibration lens falls within a movable range corresponding to the movable range of the imaging element while the processor effects control relative to the driving source so as to make the suppression operation of the lens-side driving source more dominant than the suppression operation of the imaging element-side driving source.

14. An imaging control method for an imaging device comprising a driving source that moves an anti-vibration element including at least one of an imaging element, which receives reflected light representing a subject as a subject image, or an anti-vibration lens, which is provided in an imaging lens mounted on an imaging device body including the imaging element, to a position that is determined according to a detection result of a sensor that detects vibration applied to a device, to suppress an influence of the vibration on the subject image, the imaging control method comprising:

effecting control relative to a display, which displays an image, so as to display the subject image, which is received by the imaging element, as a video image and effecting control relative to the driving source so as to center the anti-vibration element while a visibility-obstruction phenomenon, which is predetermined as a phenomenon capable of obstructing visual recognition of a shift in an angle of view accompanying centering of the anti-vibration element, occurs in a state in which an operation of displaying the video image is being performed by the display and an operation of suppressing the influence is being performed by the driving source, wherein:

the visibility-obstruction phenomenon occurs in a case in which a video recording-start condition for starting recording of the video image is satisfied, and the visibility-obstruction phenomenon is a phenomenon stopping an operation for displaying the video image and occurring inevitably during the operation for displaying the video image.

15. An imaging control method for an imaging device comprising a driving source that moves an anti-vibration element including at least one of an imaging element, which receives reflected light representing a subject as a subject image, or an anti-vibration lens, which is provided in an imaging lens mounted on an imaging device body including the imaging element, to a position that is determined according to a detection result of a sensor that detects vibration applied to a device, to suppress an influence of the vibration on the subject image, the imaging control method comprising:

effecting control relative to a display, which displays an image, so as to display the subject image, which is received by the imaging element, as a video image and effecting control relative to the driving source so as to center the anti-vibration element while a visibility-obstruction phenomenon, which is predetermined as a phenomenon capable of obstructing visual recognition of a shift in an angle of view accompanying centering of the anti-vibration element, occurs in a state in which an operation of displaying the video image is being performed by the display and an operation of suppressing the influence is being performed by the driving source, and effecting control relative to the driving source so as to stop the operation of suppressing the influence by the driving source and effecting control relative to the display so as to display the subject image, which is received by the imaging element, as a video image, in a case in which the centering of the anti-vibration element is complete, wherein the visibility-obstruction phenomenon occurs in a case in which a video recording-end condition for ending recording of the video is satisfied.

16. An imaging control method for an imaging device comprising a driving source that moves an anti-vibration element including at least one of an imaging element, which receives reflected light representing a subject as a subject image, or an anti-vibration lens, which is provided in an imaging lens mounted on an imaging device body including the imaging element, to a position that is determined according to a detection result of a sensor that detects vibration applied to a device, to suppress an influence of the vibration on the subject image, the imaging control method comprising:

effecting control relative to a display, which displays an image, so as to display the subject image, which is received by the imaging element, as a video image and effecting control relative to the driving source so as to center the anti-vibration element while a visibility-obstruction phenomenon, which is predetermined as a phenomenon capable of obstructing visual recognition of a shift in an angle of view accompanying centering of the anti-vibration element, occurs in a state in which an operation of displaying the video image is being performed by the display and an operation of suppressing the influence is being performed by the driving source, wherein the visibility-obstruction phenomenon includes a phenomenon such that, among the images included in the video image, a plurality of images, in each of which an absolute value of magnitude of a movement vector is equal to or larger than a first threshold value, are displayed at the display.

17. An imaging control method for an imaging device comprising a driving source that moves an anti-vibration element including at least one of an imaging element, which receives reflected light representing a subject as a subject image, or an anti-vibration lens, which is provided in an imaging lens mounted on an imaging device body including the imaging element, to a position that is determined according to a detection result of a sensor that detects vibration applied to a device, to suppress an influence of the vibration on the subject image, the imaging control method comprising:

effecting control relative to a display, which displays an image, so as to display the subject image, which is received by the imaging element, as a video image and effecting control relative to the driving source so as to center the anti-vibration element while a visibility-obstruction phenomenon, which is predetermined as a phenomenon capable of obstructing visual recognition of a shift in an angle of view accompanying centering of the anti-vibration element, occurs in a state in which an operation of displaying the video image is being performed by the display and an operation of suppressing the influence is being performed by the driving source, wherein the visibility-obstruction phenomenon includes a phenomenon such that, among the images included in the video image, a plurality of images, in each of which an amount of change in a physical quantity representing brightness is equal to or larger than a second threshold value, are displayed at the display.

18. An imaging control method for an imaging device comprising a driving source that moves an anti-vibration element including at least one of an imaging element, which receives reflected light representing a subject as a subject image, or an anti-vibration lens, which is provided in an imaging lens mounted on an imaging device body including the imaging element, to a position that is determined according to a detection result of a sensor that detects vibration applied to a device, to suppress an influence of the vibration on the subject image, the imaging control method comprising:

effecting control relative to a display, which displays an image, so as to display the subject image, which is received by the imaging element, as a video image and effecting control relative to the driving source so as to center the anti-vibration element while a visibility-obstruction phenomenon, which is predetermined as a phenomenon capable of obstructing visual recognition of a shift in an angle of view accompanying centering of the anti-vibration element, occurs in a state in which an operation of displaying the video image is being perform by the display and an operation for suppressing the influence by the driving source; and, effecting control relative to the driving source so as to perform an operation of suppressing the influence using, of an imaging element-side driving source and a lens-side driving source, only the imaging element-side driving source during the operation of displaying the video image by the display, and effecting control relative to the imaging element-side driving source to center the imaging element while the visibility-obstruction phenomenon occurs in a state in which the operation of displaying the video image is being performed by the display and the operation of suppressing the influence is being performed by only the imaging element-side driving source, wherein:

the driving source is broadly divided into an imaging element-side driving source that moves the imaging element to the position determined according to the detection result so as to suppress the influence, and a lens-side driving source that moves the anti-vibration lens to the position determined according to the detection result so as to suppress the influence, the visibility-obstruction phenomenon is predetermined as a phenomenon capable of obstructing visual recognition of a shift in an angle of view accompanying centering of the imaging element.

19. A non-transitory computer-readable storage medium storing a program for causing a computer to execute a process, the computer being used as an imaging device comprising a driving source that moves an anti-vibration element including at least one of an imaging element, which receives reflected light representing a subject as a subject image, or an anti-vibration lens_that is provided in an imaging lens mounted on an imaging device body including the imaging element, to a position that is determined according to a detection result of a sensor that detects vibration applied to a device, to suppress an influence of the vibration on the subject image, the process comprising:

effecting control relative to a display, which displays an image, so as to display the subject image, which is received by the imaging element, as a video image and effecting control relative to the driving source so as to center the anti-vibration element while a visibility-obstruction phenomenon, which is predetermined as a phenomenon capable of obstructing visual recognition of a shift in an angle of view accompanying centering of the anti-vibration element, occurs in a state in which an operation of displaying the video image is being performed by the display and an operation of suppressing the influence is being performed by the driving source, wherein:

the visibility-obstruction phenomenon occurs in a case in which a video recording-start condition for starting recording of the video image is satisfied, and the visibility-obstruction phenomenon is a phenomenon stopping an operation for displaying the video image and occurring inevitably during the operation for displaying the video image.

20. A non-transitory computer-readable storage medium storing a program for causing a computer to execute a process, the computer being used as an imaging device comprising a driving source that moves an anti-vibration element including at least one of an imaging element, which receives reflected light representing a subject as a subject image, or an anti-vibration lens, which is provided in an imaging lens mounted on an imaging device body including the imaging element, to a position that is determined according to a detection result of a sensor that detects vibration applied to a device, to suppress an influence of the vibration on the subject image, the process comprising:

effecting control relative to a display, which displays an image, so as to display the subject image, which is received by the imaging element, as a video image and effecting control relative to the driving source so as to center the anti-vibration element while a visibility-obstruction phenomenon, which is predetermined as a phenomenon capable of obstructing visual recognition of a shift in an angle of view accompanying centering of the anti-vibration element, occurs in a state in which an operation of displaying the video image is being performed by the display and an operation for suppressing the influence is being performed by the driving source; and effecting control relative to the driving source so as to stop the operation of suppressing the influence by the driving source and effecting control relative to the display so as to display the subject image, which is received by the imaging element, as a video image, in a case in which the centering of the anti-vibration element is complete, wherein the visibility-obstruction phenomenon occurs in a case in which a video recording-end condition for ending recording of the video is satisfied.

21. A non-transitory computer-readable storage medium storing a program for causing a computer to execute a process, the computer being used for an imaging device comprising a driving source that moves an anti-vibration element including at least one of an imaging element, which receives reflected light representing a subject as a subject image, or an anti-vibration lens, which is provided in an imaging lens mounted on an imaging device body including the imaging element, to a position that is determined according to a detection result of a sensor that detects vibration applied to a device, to suppress an influence of the vibration on the subject image, the process comprising:

effecting control relative to a display, which displays an image, so as to display the subject image, which is received by the imaging element, as a video image and effecting control relative to the driving source so as to center the anti-vibration element while a visibility-obstruction phenomenon, which is predetermined as a phenomenon capable of obstructing visual recognition of a shift in an angle of view accompanying centering of the anti-vibration element, occurs in a state in which an operation of displaying the video image is being performed by the display and an operation of suppressing the influence is being performed by the driving source, wherein the visibility-obstruction phenomenon includes a phenomenon such that, among images included in the video image, a plurality of images, in each of which an absolute value of magnitude of a movement vector is equal to or larger than a first threshold value, are displayed at the display.

22. A non-transitory computer-readable storage medium storing a program for causing a computer to execute a process, the computer being used for an imaging device comprising a driving source that moves an anti-vibration element including at least one of an imaging element, which receives reflected light representing a subject as a subject image, or an anti-vibration lens, which is provided in an imaging lens mounted on an imaging device body including the imaging element, to a position that is determined according to a detection result of a sensor that detects vibration applied to a device, to suppress an influence of the vibration on the subject image, the process comprising:

effecting control relative to a display, which displays an image, so as to display the subject image, which is received by the imaging element, as a video image and effecting control relative to the driving source so as to center the anti-vibration element while a visibility-obstruction phenomenon, which is predetermined as a phenomenon capable of obstructing visual recognition of a shift in an angle of view accompanying centering of the anti-vibration element, occurs in a state in which an operation of displaying the video image is being performed by the display and an operation for suppressing the influence is being performed by the driving source, wherein the visibility-obstruction phenomenon includes a phenomenon such that, among the images included in the video, a plurality of images, in each of which an amount of change in a physical quantity representing brightness is equal to or larger than a second threshold value, are displayed at the display.

23. A non-transitory computer-readable storage medium storing a program for causing a computer to execute a process, the computer being used for an imaging device comprising a driving source that moves an anti-vibration element including at least one of an imaging element, which receives reflected light representing a subject as a subject image, or an anti-vibration lens, which is provided in an imaging lens mounted on an imaging device body including the imaging element, to a position that is determined according to a detection result of a sensor that detects vibration applied to a device, to suppress an influence of the vibration on the subject image, the process comprising:

effecting control on a display, which displays an image, so as to display the subject image, which is received by the imaging element, as a video image and effecting control relative to the driving source so as to center the anti-vibration element while a visibility-obstruction phenomenon, which is predetermined as a phenomenon capable of obstructing visual recognition of a shift in an angle of view accompanying centering of the anti-vibration element, occurs in a state in which an operation of displaying the video image is being performed by the display and an operation of suppressing the influence is being performed by the driving source, and effecting control relative to the driving source so as to perform an operation of suppressing the influence using, of an imaging element-side driving source and a lens-side driving source, only the imaging element-side driving source during the operation of displaying the video image by the display, and effecting control relative to the imaging element-side driving source to center the imaging element while the visibility-obstruction phenomenon occurs in a state in which the operation of displaying the video image is being performed by the display and the operation of suppressing the influence is being performed by only the imaging element-side driving source, wherein:

the driving source is broadly divided into the imaging element-side driving source, which moves the imaging element to the position determined according to the detection result to suppress the influence, and the lens-side driving source, which moves the anti-vibration lens to the position determined according to the detection result to suppress the influence, and the visibility-obstruction phenomenon is predetermined as a phenomenon capable of obstructing visual recognition of a shift in an angle of view caused by centering of the imaging element.

* * * * *